(12) United States Patent
Tang et al.

(10) Patent No.: US 8,885,268 B2
(45) Date of Patent: Nov. 11, 2014

(54) OPTICAL IMAGE COLLECTING SYSTEM

(71) Applicant: Largan Precision Co., Ltd., Taichung (TW)

(72) Inventors: Hsiang-Chi Tang, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 133 days.

(21) Appl. No.: 13/785,350

(22) Filed: Mar. 5, 2013

(65) Prior Publication Data

US 2014/0192422 A1    Jul. 10, 2014

(30) Foreign Application Priority Data

Jan. 4, 2013   (TW) .............................. 102100195 U

(51) Int. Cl.
*G02B 13/00* (2006.01)
*G02B 13/18* (2006.01)
*G02B 9/62* (2006.01)

(52) U.S. Cl.
CPC ................. G02B 13/18 (2013.01); G02B 9/62 (2013.01); G02B 13/0045 (2013.01)
USPC ............ 359/713; 359/708; 359/756; 359/757

(58) Field of Classification Search
CPC ....... G02B 13/18; G02B 13/0045; G02B 9/62
USPC .......................................... 359/708, 713, 757
See application file for complete search history.

(56) References Cited

U.S. PATENT DOCUMENTS

| 7,869,142 | B2 | 1/2011 | Chen et al. |
| 8,000,031 | B1 | 8/2011 | Tsai |
| 8,514,499 | B2 * | 8/2013 | Hsu et al. ...................... 359/713 |
| 8,643,957 | B2 * | 2/2014 | Chen et al. ................... 359/713 |
| 8,717,685 | B2 * | 5/2014 | Tsai et al. ..................... 359/739 |
| 8,743,482 | B1 * | 6/2014 | Tsai et al. ..................... 359/757 |
| 8,743,483 | B2 * | 6/2014 | Hsu et al. ...................... 359/761 |
| 8,780,457 | B2 * | 7/2014 | Tang et al. .................... 359/713 |

(Continued)

FOREIGN PATENT DOCUMENTS

| KR | 1020100040357 | 4/2010 |
| WO | 2013150755 A1 | 10/2013 |
| WO | 2014006822 A1 | 1/2014 |

*Primary Examiner* — Thomas K Pham
*Assistant Examiner* — Collin X Beatty
(74) *Attorney, Agent, or Firm* — Tim Tingkang Xia, Esq.; Morris, Manning & Martin, LLP

(57) ABSTRACT

An optical image collecting system includes, in order from an object side to an image side, a first lens element, a second lens element, a third lens element, a fourth lens element, a fifth lens element and a sixth lens element. The first lens element with positive refractive power has a convex object-side surface. The second through sixth lens elements all have refractive power. The fifth lens element has a concave object-side surface and a convex image-side surface, wherein at least one of the object-side surface and the image-side surface of the fifth lens element is aspheric. The sixth lens element has a concave image-side surface at a paraxial region, wherein the image-side surface of the sixth lens element changes from concave at the paraxial region to convex at a peripheral region, and both of an object-side surface and the image-side surface of the sixth lens element are aspheric.

22 Claims, 15 Drawing Sheets

(56) References Cited

U.S. PATENT DOCUMENTS

| | | | |
|---|---|---|---|
| 2012/0188654 A1* | 7/2012 | Huang | 359/713 |
| 2012/0243108 A1 | 9/2012 | Tsai et al. | |
| 2013/0120858 A1* | 5/2013 | Sano | 359/713 |
| 2013/0279021 A1* | 10/2013 | Chen et al. | 359/713 |
| 2013/0335833 A1* | 12/2013 | Liao et al. | 359/713 |
| 2013/0335834 A1* | 12/2013 | Tsai et al. | 359/713 |

* cited by examiner

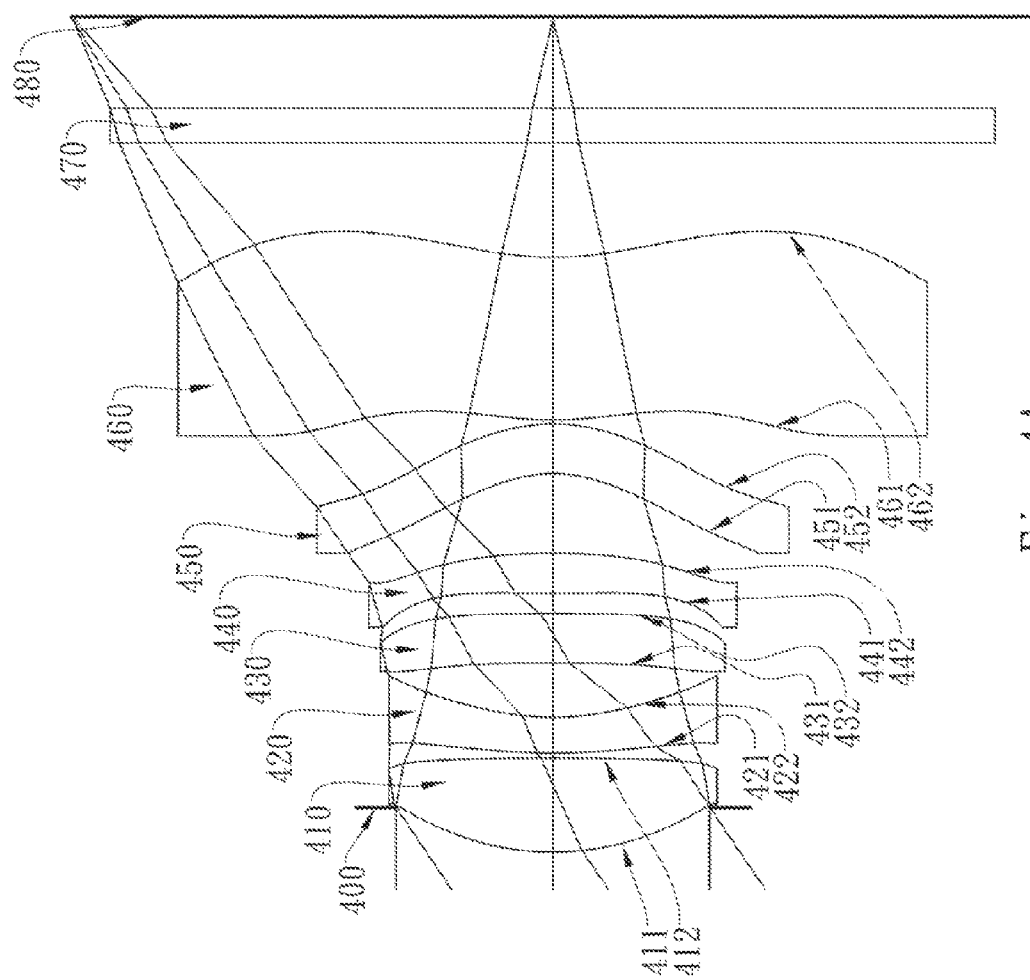

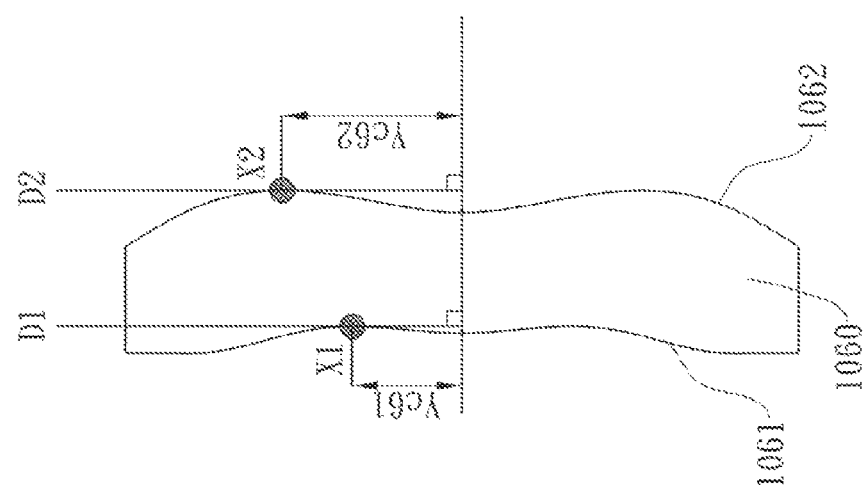

US 8,885,268 B2

OPTICAL IMAGE COLLECTING SYSTEM

RELATED APPLICATIONS

The application claims priority to Taiwan Application Serial Number 102100195, filed Jan. 4, 2013, which is herein incorporated by reference.

BACKGROUND

1. Technical Field

The present disclosure relates to an optical image collecting system. More particularly, the present invention relates to a miniaturized optical image collecting system applicable to electronic products.

2. Description of Related Art

In recent years, with the popularity of mobile products with camera functionalities, a demand for miniaturized optical system is increasing. A photosensitive sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and the optical systems have gradually evolved toward a field of higher megapixels, there is an increasing demand for better image quality.

A conventional optical system employed in a portable electronic product, as shown in the U.S. Pat. Nos. 7,869,142 and 8,000,031, mainly adopts a structure of four lens elements or five lens elements. Due to the popularity of mobile products with high-end specifications, such as smart phones Tablet PC and PDAs (Personal Digital Assistants), requirements of higher megapixels and better image quality have increased rapidly. However, the conventional optical systems cannot satisfy the requirements of high-end optical systems with camera functionalities.

A conventional optical system with six lens elements, as shown in US publication No. 2012/0243108, is favorable for improving resolving power. However, the refractive power of the fifth lens element tends to result in excessive aberrations which are not favorable for correction. Besides, the optical system lacks a meniscus lens element having a concave object-side surface so that it is not favorable for correcting astigmatism and off-axis aberration. It is also not favorable for the responding efficiency of an image sensor so as to influence image quality.

Since the miniaturized optical system with high resolving power applicable to electronic products has become a trend, an optical system with short total track length and high image quality is needed. Therefore, it is favorable for avoiding the excessive refractive power which results into aberration, it is favorable for reducing the angle of incidence onto the image sensor from the off-axis field, and it is also favorable for the image sensor fully receiving the lights from objects so as to improve image quality.

SUMMARY

In one practice of the present disclosure, the optical image collecting system in order from an object side to an image side, includes a first lens element, a second lens element, a third lens element, a fourth lens element, a fifth lens element and a sixth lens element. The first lens element with positive refractive power has a convex object-side surface. The second lens element has refractive power. The third lens element has refractive power. The fourth lens element has refractive power. The fifth lens element with refractive power has a concave object-side surface and a convex image-side surface, wherein at least one of the object-side surface and the image-side surface of the fifth lens element is aspheric. The sixth lens element with refractive power has a concave image-side surface at a paraxial region, wherein the image-side surface of the sixth lens element changes from concave at the paraxial region to convex at a peripheral region, and both of an object-side surface and the image-side surface of the sixth lens element are aspheric. The said optical image collecting system has a total of six lens elements with refractive power. When a focal length of the optical image collecting system is f, a focal length of the fifth lens element is f5, a vertical distance between a non-axial critical point on the image-side surface of the sixth lens element and an optical axis is Yc62, a central thickness of the third lens element is CT3, a central thickness of the fourth lens element is CT4, and a central thickness of the fifth lens element is CT5, the following relationships are satisfied:

$-1.3 < f/f5 < 0.7;$ $0.15 < Yc62/f < 0.50;$ and $4.6 < f/(CT3+CT4+CT5) < 7.0.$

According to another aspect of the present disclosure, an optical image collecting system includes, in order from an object side to an image side, a first lens element, a second lens element, a third lens element, a fourth lens element, a fifth lens element and a sixth lens element. The first lens element with positive refractive power has a convex object-side surface. The second lens element with negative refractive power has a concave image-side surface. The third lens element has refractive power. The fourth lens element has refractive power. The fifth lens element with refractive power has a concave object-side surface and a convex image-side surface. The sixth lens element with refractive power has a concave image-side surface at a paraxial region, wherein the image-side surface of the sixth lens element changes from concave at the paraxial region to convex at a peripheral region, and both of an object-side surface and the image-side surface of the sixth lens element are aspheric. The said optical image collecting system has a total of six lens elements with refractive power. When a focal length of the optical image collecting system is f, a focal length of the fifth lens element is f5, a vertical distance between a non-axial critical point on the image-side surface of the sixth lens element and an optical axis is Yc62, a curvature radius of an object-side surface of the fourth lens element is R7, and a curvature radius of an image-side surface of the fourth lens element is R8, the following relationships are satisfied:

$-1.3 < f/f5 < 0.7;$ $0.15 < Yc62/f < 0.50;$ and $-2.0 < (R7+R8)/(R7-R8) < 0.6.$

BRIEF DESCRIPTION OF THE DRAWINGS

The invention can be more fully understood by reading the following detailed description of the embodiment, with reference made to the accompanying drawings as follows:

FIG. 4A is a schematic view of an optical image collecting system according to the 4th embodiment of the present disclosure;

FIG. 8 shows Yc61 and Yc62 of the optical image collecting system.

DETAILED DESCRIPTION

Figure 1A:
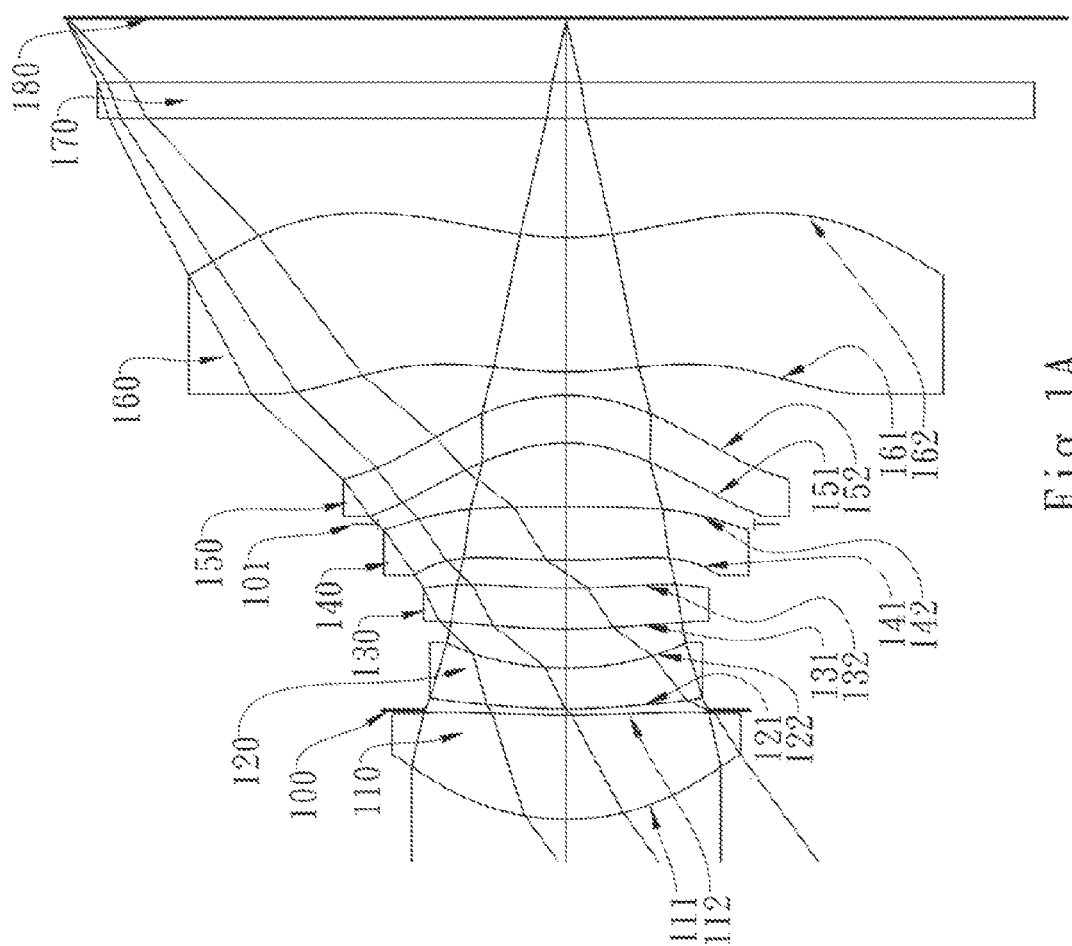
FIG. 1A is a schematic view of an optical image collecting system according to the 1st embodiment of the present disclosure.

An optical image collecting system in order from an object side to an image side, includes a first lens element, a second lens element, a third lens element, a fourth lens element, a fifth lens element and a sixth lens element.

The first lens element has positive refractive power, so that it provides the optical image collecting system with the positive refractive power as it needs to be, and it is favorable for reducing the total track length thereof. Moreover, the first lens element has a convex object-side surface and can have a concave image-side surface, so that it is favorable for further adjusting the positive refractive power.

The second lens element can have negative refractive power, so that it is favorable for correcting the aberration caused by the positive refractive power of the first lens element and correcting the chromatic aberration of the optical image collecting system. Moreover, the second lens element can have a convex object-side surface and a concave image-side surface, so that it is favorable for correcting the astigmatism of the optical image collecting system.

The fourth lens element can have positive refractive power, so that it is favorable for effectively distributing the refractive power of the first lens element so as to reduce the sensitivity of the optical image collecting system.

The fifth lens element can have negative refractive power, so that the Petzval sum of the optical image collecting system can be corrected effectively which is favorable for the peripheral field of view better focusing on the image plane with higher resolving power. Moreover, the fifth lens element has a concave object-side surface and a convex image-side surface, so that the astigmatism of the optical image collecting system can be further corrected.

The sixth lens element has a convex object-side surface at a paraxial region and a concave image-side surface at a paraxial region, wherein the image-side surface changes from concave at the paraxial region to convex at a peripheral region, so that the aberration of the off-axis can be effectively corrected, and a principal point of the optical image collecting system can be positioned away from the image plane for reducing a back focal length thereof so as to maintain a compact size thereof.

When a focal length of the optical image collecting system is f, and the focal length of the fifth lens element is f5, the following relationship is satisfied: $-1.3 < f/f5 < 0.7$. Consequently, it is favorable for improving the resolving power. Preferably, the following relationship is satisfied: $-0.7 < f/f5 < 0.5$.

When the focal length of the optical image collecting system is f, and a vertical distance between a non-axial critical point on the image-side surface of the sixth lens element and an optical axis is Yc62, the following relationship is satisfied: $0.15 < Yc62/f < 0.50$. Accordingly, the angle at which the incident light projects onto the image sensor from the off-axis field can be effectively reduced so as to further correct the aberration of the off-axis.

When the focal length of the optical image collecting system is f, a central thickness of the third lens element is CT3, a central thickness of the fourth lens element is CT4, and a central thickness of the fifth lens element is CT5, the following relationship is satisfied: $4.0 < f/(CT3+CT4+CT5) < 9.0$. Therefore, it can avoid deformed lens elements during manufacturing process and provide favorable moldability and homogeneity for plastic lens elements during the injection molding process and achieve superior image quality. Preferably, the following relationship is satisfied: $4.6 < f/(CT3+CT4+CT5) < 7.0$. More preferably, the following relationship is further satisfied: $4.85 < f/(CT3+CT4+CT5) < 6.5$.

When a curvature radius of the object-side surface of the fourth lens element is R7, and a curvature radius of the image-side surface of the fourth lens element is R8, the following relationship is satisfied: $-2.0 < (R7+R8)/(R7-R8) < 0.6$. By such an arrangement, it is favorable for reducing system sensitivity and reducing aberration.

When a vertical distance between a non-axial critical point on the object-side surface of the sixth lens element and the optical axis is Yc61, and a vertical distance between a non-axial point on the image-side surface of the sixth lens element and the optical axis is Yc62, the following relationship is satisfied: $Yc62 > Yc61$. Accordingly, the angle at which the incident light projects onto the image sensor from the off-axis field can be effectively reduced and it can further correct the aberration of the off-axis.

When an Abbe number of the first lens element is V1, and an Abbe number of the fifth lens element is V5, the following relationship is satisfied: $0.3<V5/V1<0.6$. Accordingly, the chromatic aberration of the optical image collecting system can be corrected.

When the focal length of the optical image collecting system is f, a focal length of the third lens element is f3, a focal length of the fifth lens element is f5, and a focal length of the sixth lens element is f6, the following relationship is satisfied: $0.2<|f/f3|+|f/f5|+|f/f6|<1.0$. By properly arranging the refractive power, the sensitivity of the optical image collecting system can be reduced so as to reduce the aberration.

In the aforementioned optical image collecting system, at least one stop is disposed between the third lens element and the sixth lens element. Therefore, it is favorable for eliminating the stray light and thereby improving image quality.

In the aforementioned optical image collecting system, at least four lens elements with refractive power among the first through sixth lens elements of the optical image collecting system have a central thickness less than or equal to 0.300 mm. Therefore, it is favorable for reducing the total track length of the optical image collecting system so as to maintain a compact size.

When a curvature radius of the object-side surface of the sixth lens element is R11, and a curvature radius of the image-side surface of the sixth lens element is R12, the following relationship is satisfied: $0.2<R12/R11<1.5$. By such an arrangement, it is favorable for reducing the total track length of the optical image collecting system and correcting the aberration.

When the curvature radius of the image-side surface of the sixth lens element is R12, and a focal length of the second lens element is f2, the following relationship is satisfied: $-0.6<R12/f2<0$. By such an arrangement, it is favorable for correcting the aberration and reducing the total track length of the optical image collecting system so as to keep the system compact.

When the central thickness of the fifth lens element is CT5, and a central thickness of the sixth lens element is CT6, the following relationship is satisfied: $0.20<CT5/CT6<0.65$. Therefore, it is favorable for avoiding the lens elements with an excessively thin thickness or an excessively thick thickness which might be resulted into deformed lens elements.

When a curvature radius of the object-side surface of the fifth lens element is R9, and a curvature radius of the image-side surface of the fifth lens element is R10, the following relationship is satisfied: $-0.30<(R9-R10)/(R9+R10)<0.20$. By such an arrangement, it is favorable for correcting the astigmatism of the optical image collecting system.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and an axial distance between the fifth lens element and the sixth lens element is T56, the following relationship is satisfied: $0.15<(T12+T34+T56)/(T23+T45)<0.90$. By such an arrangement, it is favorable for assembling the lens elements and keeping the optical image collecting system compact so as to effectively arrange the axial distances between lens elements.

In the optical image collecting system of the disclosure, the lens elements can be made of plastic or glass material. When the lens elements are made of glass material, the distribution of the refractive power of the optical image collecting system can be more flexible to design. When the lens elements are made of plastic material, the manufacturing cost thereof can be decreased. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Thus, the total track length of the optical image collecting system can be effectively reduced.

In the optical image collecting system of the disclosure, the optical image collecting system can include at least one stop, such as an aperture stop, a glare stop or a field stop. Said glare stop or said field stop is for eliminating the stray light and thereby improving the image resolution thereof.

In the present optical image collecting system, an aperture stop can be configured as a front stop or a middle stop. A front stop can provide a longer distance between an exit pupil of the system and an image plane and which improves the image-sensing efficiency of an image sensor. A middle stop is favorable for enlarging the field of view of the system and thereby provides a wider field of view for the same.

In the optical image collecting system of the disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the surface is convex at the paraxial region; and when the lens element has a concave surface, it indicates that the surface is concave at the paraxial region.

Please refer to FIG. 8, according to the optical image collecting system of the present disclosure; a critical point is a non-axial point of the lens surface where its tangent is perpendicular to the optical axis. The sixth lens element 1060 has a tangent line D1 through the non-axial critical point X1 on the object-side surface 1061 that is perpendicular to an optical axis, and a vertical distance between the non-axial critical point X1 on the object-side surface 1061 of the sixth lens element 1060 and the optical axis is Yc61. Furthermore, the sixth lens element 1060 has a tangent line D2 through the non-axial critical point X2 on the image-side surface 1062 that is perpendicular to the optical axis, and a vertical distance between the non-axial critical point X2 on the image-side surface 1062 of the sixth lens element 1060 and the optical axis is Yc62.

According to the above description of the present disclosure, the following 1st-7th specific embodiments are provided for further explanation.

1st Embodiment

Figure 1B:
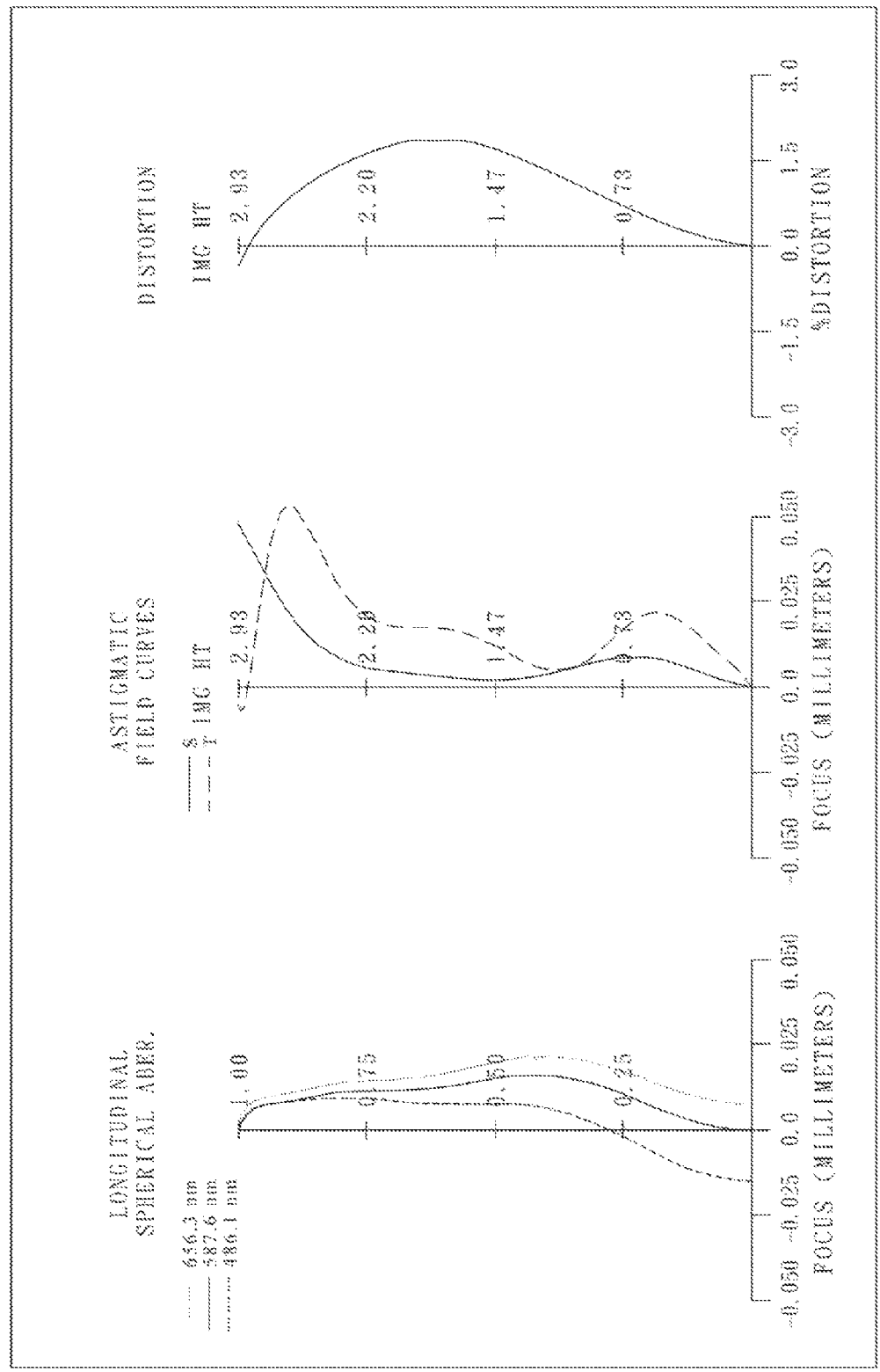
FIG. 1B shows, in order from left to right, spherical aberration curves, astigmatic field curves and a distortion curve of the optical image collecting system according to the 1st embodiment.

FIG. 1A is a schematic view of an optical image collecting system according to the 1st embodiment of the present disclosure. FIG. 1B shows, in order from left to right, spherical aberration curves, astigmatic field curves and a distortion curve of the optical image collecting system according to the 1st embodiment. In FIG. 1A, the optical image collecting system includes, in order from an object side to an image side, a first lens element 110, an aperture stop 100, a second lens element 120, a third lens element 130, a fourth lens element 140, a stop 101, a fifth lens element 150, a sixth lens element 160, an IR-cut filter 170 and an image plane 180.

The first lens element 110 with positive refractive power has a convex object-side surface 111 at a paraxial region and a concave image-side surface 112 at a paraxial region, which are both aspheric, and the first lens element 110 is made of plastic material.

The second lens element 120 with negative refractive power has a convex object-side surface 121 at a paraxial region and a concave image-side surface 122 at a paraxial region, which are both aspheric, and the second lens element 120 is made of plastic material.

The third lens element 130 with negative refractive power has a convex object-side surface 131 at a paraxial region and a concave image-side surface 132 at a paraxial region, which are both aspheric, and the third lens element 130 is made of plastic material.

The fourth lens element 140 with positive refractive power has a convex object-side surface 141 at a paraxial region and a convex image-side surface 142 at a paraxial region, which are both aspheric, and the fourth lens element 140 is made of plastic material.

The fifth lens element 150 with negative refractive power has a concave object-side surface 151 at a paraxial region and a convex image-side surface 152 at a paraxial region, which are both aspheric, and the fifth lens element 150 is made of plastic material.

The sixth lens element 160 with negative refractive power has a convex object-side surface 161 at a paraxial region and a concave image-side surface 162 at a paraxial region which are both aspheric, and the sixth lens element 160 is made of plastic material. The image-side surface 162 changes from concave at the paraxial region to convex at a peripheral region.

The IR-cut filter 170 is made of glass and located between the sixth lens element 160 and the image plane 180, and will not affect the focal length of the optical image collecting system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where:

X is the relative distance between a point on the aspheric surface spaced at a distance Y from the optical axis and the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the optical image collecting system according to the 1st embodiment, when a focal length of the optical image collecting system is f, an f-number of the optical image collecting system is Fno, and a half of the maximal field of view of the optical image collecting system is HFOV, these parameters have the following values:

f=4.04 mm;

Fno=2.23; and

HFOV=36.0 degrees.

In the optical image collecting system according to the 1st embodiment, when an Abbe number of the first lens element 110 is V1, and an Abbe number of the fifth lens element 150 is V5, the following relationship is satisfied: V5/V1=0.42.

In the optical image collecting system according to the 1st embodiment, when the focal length of the optical image collecting system is f, a central thickness of the third lens element 130 is CT3, a central thickness of the fourth lens element 140 is CT4, and a central thickness of the fifth lens element 150 is CT5, the following relationship is satisfied: f/(CT3+CT4+CT5)=4.89.

In the optical image collecting system according to the 1st embodiment, when the central thickness of the fifth lens element 150 is CT5, and a central thickness of the sixth lens element 160 is CT6, the following relationship is satisfied: CT5/CT6=0.35.

In the optical image collecting system according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, and an axial distance between the fifth lens element 150 and the sixth lens element 160 is T56, the following relationship is satisfied: (T12+T34+T56)/(T23+T45)=0.56.

In the optical image collecting system according to the 1st embodiment, when a curvature radius of the object-side surface 141 of the fourth lens element 140 is R7, and a curvature radius of the image-side surface 142 of the fourth lens element 140 is R8, the following relationship is satisfied: (R7+R8)/(R7−R8)=−0.76.

In the optical image collecting system according to the 1st embodiment, when a curvature radius of the object-side surface 151 of the fifth lens element 150 is R9, and a curvature radius of the image-side surface 152 of the fifth lens element 150 is R10, the following relationship is satisfied: (R9−R10)/(R9+R10)=−0.07.

In the optical image collecting system according to the 1st embodiment, when a curvature radius of the object-side surface 161 of the sixth lens element 160 is R11, and a curvature radius of the image-side surface 162 of the sixth lens element 160 is R12, the following relationship is satisfied: R12/R11=0.71.

In the optical image collecting system according to the 1st embodiment, when a focal length of the second lens element 120 is f2, and the curvature radius of the image-side surface 162 of the sixth lens element 160 is R12, the following relationship is satisfied: R12/f2=−0.29.

In the optical image collecting system according to the 1st embodiment, when the focal length of the optical image collecting system is f, and a focal length of the fifth lens element 150 is f5, the following relationship is satisfied: f/f5=−0.10.

In the optical image collecting system according to the 1st embodiment, when the focal length of the optical image collecting system is f, a focal length of the third lens element 130 is f3, the focal length of the fifth lens element 150 is f5, and a focal length of the sixth lens element 160 is f6, the following relationship is satisfied: |f/f3|+|f/f5|+|f/f6|=0.34.

In the optical image collecting system according to the 1st embodiment, when a vertical distance between the non-axial critical point on the object-side surface 161 of the sixth lens element 160 and the optical axis is Yc61; and a vertical distance between the non-axial critical point on the image-side surface 162 of the sixth lens element 160 and the optical axis is Yc62. Furthermore, Yc61=0.72 (mm) and 1.80 (mm), and Yc62=1.18 (mm). The object-side surface and the image-side surface both have at least one critical point to satisfy the following relationship: Yc62>Yc61.

In the optical image collecting system according to the 1st embodiment, when the focal length of the optical image collecting system is f; and the vertical distance between the non-axial critical point on the image-side surface 162 of the sixth lens element 160 and the optical axis is Yc62, the following relationship is satisfied: Yc62/f=0.291.

The detailed optical data of the 1st embodiment are shown in Table 1 and the aspheric surface data are shown in Table 2 below.

TABLE 1

Embodiment 1
f = 4.04 mm, Fno = 2.23, HFOV = 36.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.430 | ASP | 0.611 | Plastic | 1.544 | 55.9 | 3.26 |
| 2 | | 6.250 | ASP | 0.030 | | | | |
| 3 | Ape. Stop | Plano | | 0.007 | | | | |
| 4 | Lens 2 | 3.333 | ASP | 0.240 | Plastic | 1.640 | 23.3 | −5.86 |
| 5 | | 1.715 | ASP | 0.229 | | | | |
| 6 | Lens 3 | 3.946 | ASP | 0.240 | Plastic | 1.544 | 55.9 | −422.69 |
| 7 | | 3.796 | ASP | 0.165 | | | | |
| 8 | Lens 4 | 4.290 | ASP | 0.312 | Plastic | 1.544 | 55.9 | 6.96 |
| 9 | | −31.430 | ASP | −0.100 | | | | |
| 10 | Stop | Plano | | 0.477 | | | | |
| 11 | Lens 5 | −0.939 | ASP | 0.275 | Plastic | 1.640 | 23.3 | −38.99 |
| 12 | | −1.087 | ASP | 0.139 | | | | |
| 13 | Lens 6 | 2.393 | ASP | 0.788 | Plastic | 1.535 | 55.7 | −17.52 |
| 14 | | 1.687 | ASP | 0.700 | | | | |
| 15 | IR-cut filter | Plano | | 0.210 | Glass | 1.517 | 64.2 | — |
| 16 | | Plano | | 0.382 | | | | |
| 17 | Image | Plano | | — | | | | |

Note:
Reference wavelength (d-line) is 587.6 nm.
Half of the diameter of the stop at Surface 10 is 1.105 mm.

TABLE 2

Aspheric Coefficients

| Surface # | 1 | 2 | 4 | 5 | 6 | 7 |
|---|---|---|---|---|---|---|
| k = | −1.4060E−01 | −1.0597E+02 | −2.8638E+01 | −4.2210E+00 | −6.2062E+01 | −7.8861E+01 |
| A4 = | −1.1276E−03 | −9.8694E−02 | −1.0523E−01 | 2.8545E−02 | −5.1801E−03 | −8.9248E−02 |
| A6 = | 2.1126E−02 | 1.2600E−01 | 1.3601E−01 | 6.2440E−02 | −3.2552E−02 | −3.8125E−02 |
| A8 = | −3.7721E−02 | −1.0369E−01 | 4.6073E−02 | 1.7049E−01 | 6.5188E−04 | −8.4029E−03 |
| A10 = | −3.8930E−02 | −5.8107E−03 | −1.3174E−01 | −2.0945E−01 | 4.3445E−02 | −3.1193E−03 |
| A12 = | 9.6844E−02 | 4.5857E−02 | 4.8755E−02 | 1.5378E−01 | −1.6291E−03 | −1.8214E−03 |
| A14 = | −6.9401E−02 | −3.6527E−02 | 1.5158E−02 | −2.4257E−02 | | |

| Surface # | 8 | 9 | 11 | 12 | 13 | 14 |
|---|---|---|---|---|---|---|
| k = | −4.5662E+01 | 2.0000E+01 | −3.7030E+00 | −7.7224E−01 | −2.8202E+01 | −1.0018E+01 |
| A4 = | −1.5991E−01 | −7.2162E−02 | −6.1967E−02 | 1.1280E−01 | −1.5707E−01 | −7.8217E−02 |
| A6 = | −8.3832E−02 | −6.8836E−02 | −1.5368E−02 | −2.9349E−02 | 9.2072E−02 | 3.0696E−02 |
| A8 = | −1.2799E−02 | 1.2818E−02 | 1.0913E−01 | 3.0038E−02 | −6.5757E−02 | −1.3800E−02 |
| A10 = | −6.0088E−02 | 3.3726E−02 | −4.7950E−02 | 8.8104E−03 | 3.8545E−02 | 4.4367E−03 |
| A12 = | 2.1078E−02 | −3.2889E−03 | −2.7619E−03 | −4.9967E−03 | −1.2217E−02 | −9.0324E−04 |
| A14 = | 6.1853E−02 | 8.8825E−04 | 2.5216E−03 | −3.8281E−03 | 1.9092E−03 | 1.0369E−04 |
| A16 = | −6.2990E−02 | | 6.0252E−04 | 1.2949E−03 | −1.1721E−04 | −4.9292E−06 |

In Table 1, the curvature radius, the thickness and the focal length are shown in millimeters (mm). Surface numbers 0-17 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 2A:
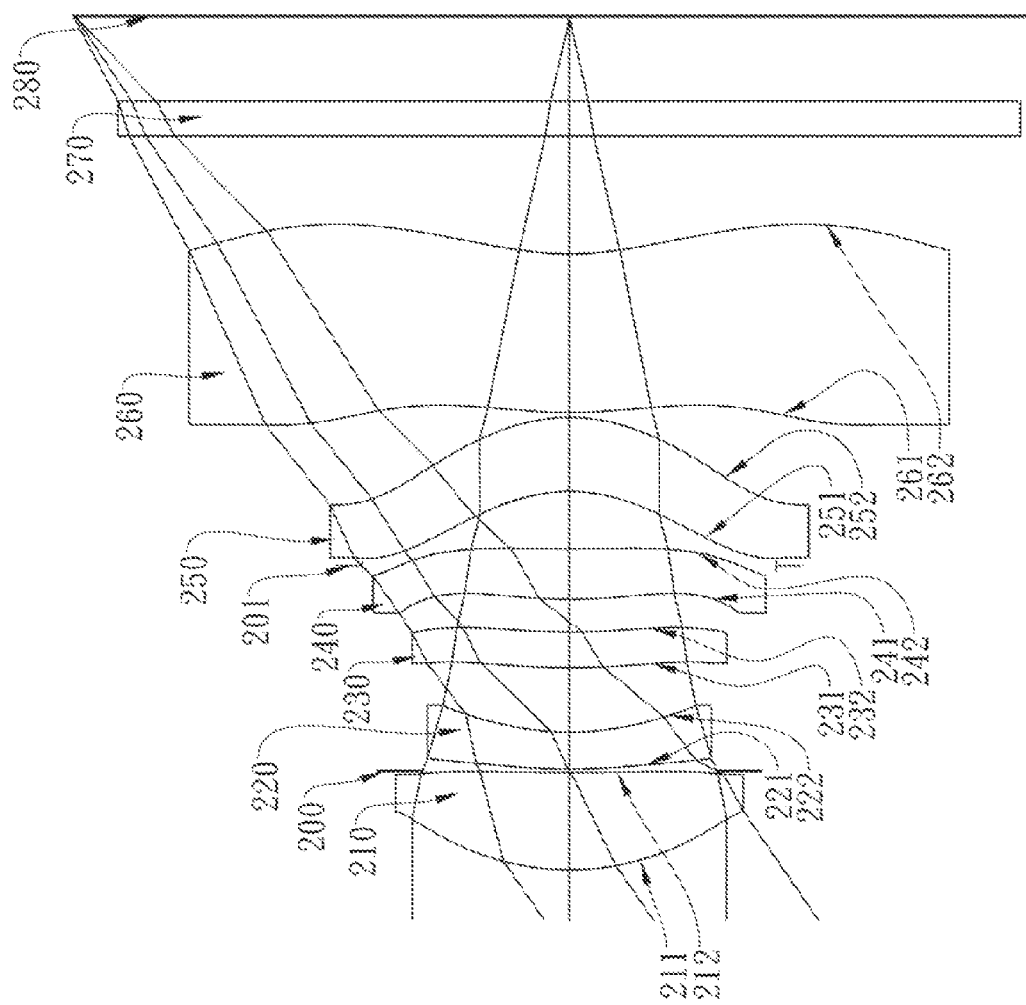
FIG. 2A is a schematic view of an optical image collecting system according to the 2nd embodiment of the present disclosure.
Figure 2B:
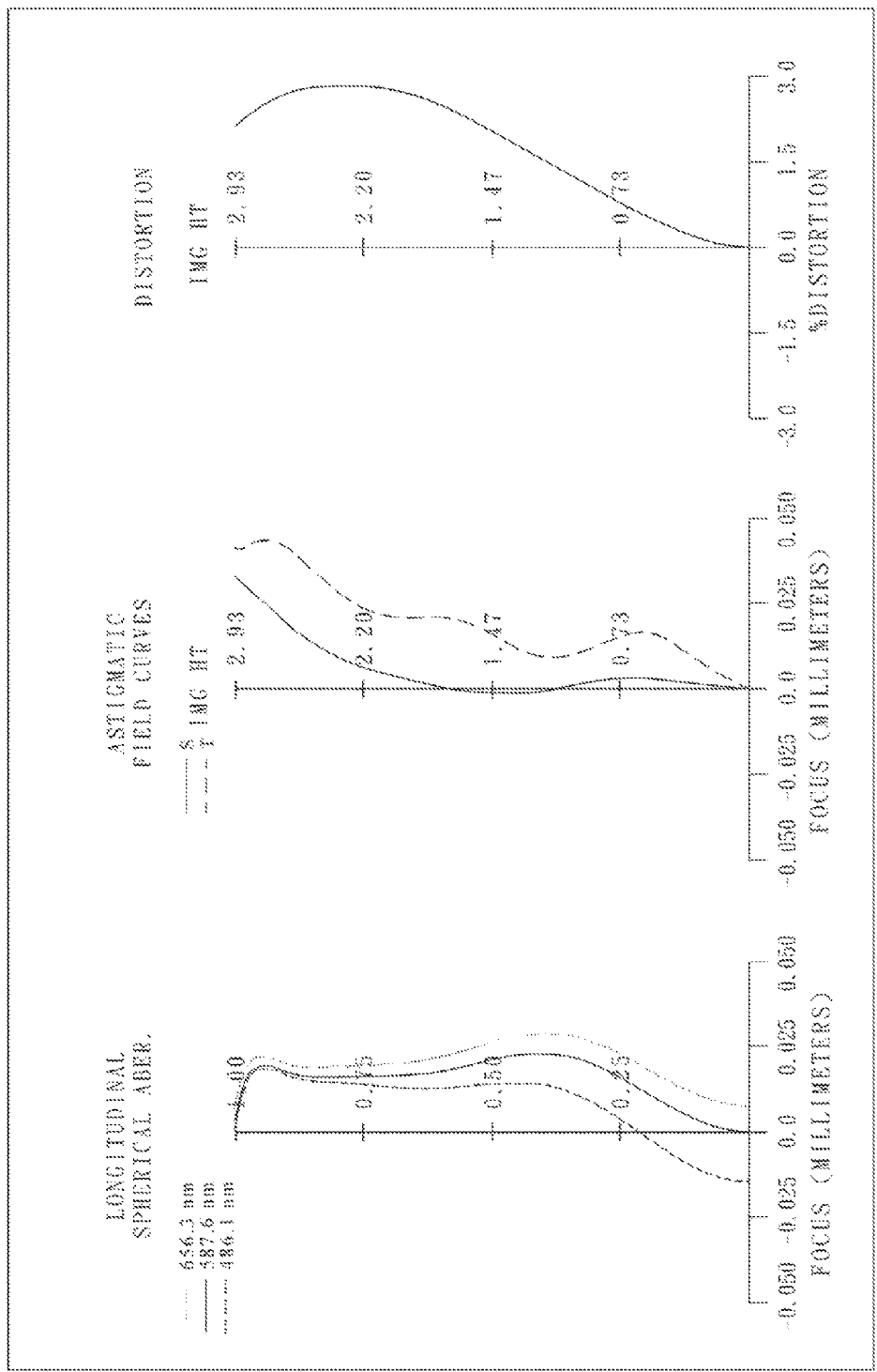
FIG. 2B shows, in order from left to right, spherical aberration curves, astigmatic field curves and a distortion curve of the optical image collecting system according to the 2nd embodiment.

FIG. 2A is a schematic view of an optical image collecting system according to the 2nd embodiment of the present disclosure. FIG. 2B shows, in order from left to right, spherical aberration curves, astigmatic field curves and a distortion curve of the optical image collecting system according to the 2nd embodiment. In FIG. 2A, the optical image collecting system includes, in order from an object side to an image side, a first lens element 210, an aperture stop 200, a second lens element 220, a third lens element 230, a fourth lens element 240, a stop 201, a fifth lens element 250, a sixth lens element 260, an IR-cut filter 270 and an image plane 280.

The first lens element 210 with positive refractive power has a convex object-side surface 211 at a paraxial region and a concave image-side surface 212 at a paraxial region, which are both aspheric, and the first lens element 210 is made of plastic material.

The second lens element 220 with negative refractive power has a convex object-side surface 221 at a paraxial region and a concave image-side surface 222 at a paraxial region, which are both aspheric, and the second lens element 220 is made of plastic material.

The third lens element 230 with negative refractive power has a convex object-side surface 231 at a paraxial region and a concave image-side surface 232 at a paraxial region, which are both aspheric, and the third lens element 230 is made of plastic material.

The fourth lens element 240 with positive refractive power has a convex object-side surface 241 at a paraxial region and a concave image-side surface 242 at a paraxial region, which are both aspheric, and the fourth lens element 240 is made of plastic material.

The fifth lens element 250 with positive refractive power has a concave object-side surface 251 at a paraxial region and a convex image-side surface 252 at a paraxial region, which are both aspheric and the fifth lens element 250 is made of plastic material.

The sixth lens element 260 with negative refractive power has a convex object-side surface 261 at a paraxial region and a concave image-side surface 262 at a paraxial region which are both aspheric, and the sixth lens element 260 is made of plastic material. The image-side surface 262 changes from concave at the paraxial region to convex at a peripheral region.

The IR-cut filter 270 is made of glass and located between the sixth lens element 260 and the image plane 280, and will not affect the focal length of the optical image collecting system.

The detailed optical data of the 2nd embodiment are shown in Table 3 and the aspheric surface data are shown in Table 4 below.

TABLE 3

Embodiment 2
f = 4.17 mm, Fno = 2.23, HFOV = 34.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.550 | ASP | 0.577 | Plastic | 1.535 | 56.3 | 3.25 |
| 2 | | 12.429 | ASP | 0.011 | | | | |
| 3 | Ape. Stop | Plano | | 0.011 | | | | |
| 4 | Lens 2 | 3.126 | ASP | 0.220 | Plastic | 1.634 | 23.8 | −5.42 |
| 5 | | 1.593 | ASP | 0.384 | | | | |
| 6 | Lens 3 | 3.945 | ASP | 0.213 | Plastic | 1.530 | 55.8 | −72.36 |
| 7 | | 3.510 | ASP | 0.194 | | | | |
| 8 | Lens 4 | 2.800 | ASP | 0.300 | Plastic | 1.530 | 55.8 | 6.14 |
| 9 | | 19.418 | ASP | −0.100 | | | | |
| 10 | Stop | Plano | | 0.443 | | | | |
| 11 | Lens 5 | −0.920 | ASP | 0.436 | Plastic | 1.530 | 55.8 | 76.99 |
| 12 | | −1.047 | ASP | 0.030 | | | | |
| 13 | Lens 6 | 2.890 | ASP | 0.944 | Plastic | 1.530 | 55.8 | −13.75 |
| 14 | | 1.835 | ASP | 0.700 | | | | |
| 15 | IR-cut filter | Plano | | 0.210 | Glass | 1.517 | 64.2 | — |
| 16 | | Plano | | 0.504 | | | | |
| 17 | Image | Plano | | — | | | | |

Note:
Reference wavelength (d-line) is 587.6 nm.
Half of the diameter of the stop at Surface 10 is 1.230 mm.

TABLE 4

Aspheric Coefficients

| Surface # | 1 | 2 | 4 | 5 | 6 | 7 |
|---|---|---|---|---|---|---|
| k = | −8.4562E−02 | −4.6009E+01 | −2.6793E+01 | −5.1496E+00 | −6.8102E+01 | −6.7059E+01 |
| A4 = | 2.4060E−03 | −8.9276E−02 | −1.0547E−01 | 1.5374E−03 | −1.6805E−02 | −9.9524E−02 |
| A6 = | 2.0909E−02 | 1.2722E−01 | 9.9807E−02 | 1.4761E−02 | −4.6652E−02 | −2.5988E−04 |
| A8 = | −3.5629E−02 | −1.4242E−01 | 2.5024E−02 | 1.4409E−01 | −9.9779E−03 | 1.4988E−02 |
| A10 = | −3.9951E−02 | 2.3648E−02 | −9.5000E−02 | −2.1362E−01 | −2.9314E−02 | −2.0587E−02 |
| A12 = | 9.9850E−02 | 4.5663E−02 | 4.8756E−02 | 1.5378E−01 | −1.6290E−03 | −1.8568E−03 |
| A14 = | −7.2198E−02 | −3.6527E−02 | 1.5158E−02 | −2.4257E−02 | | |

| Surface # | 8 | 9 | 11 | 12 | 13 | 14 |
|---|---|---|---|---|---|---|
| k = | −1.8249E+01 | −6.8469E+01 | −3.2595E+00 | −7.2834E−01 | −1.9126E+01 | −8.4095E+00 |
| A4 = | −1.3178E−01 | −7.4359E−02 | −5.4022E−02 | 1.0391E−01 | −1.4747E−01 | −6.8151E−02 |
| A6 = | −7.1040E−02 | −7.2897E−02 | −1.8470E−03 | −2.9921E−02 | 9.1394E−02 | 3.0339E−02 |
| A8 = | −4.6182E−03 | 3.6723E−03 | 1.1443E−01 | 3.4417E−02 | −6.6545E−02 | −1.3663E−02 |
| A10 = | −2.7785E−02 | 2.6450E−03 | −4.6325E−02 | 1.1425E−02 | 3.8555E−02 | 4.4489E−03 |
| A12 = | 2.1078E−02 | −2.6964E−03 | −3.0500E−03 | −4.8668E−03 | −1.2171E−02 | −9.0630E−04 |
| A14 = | 6.1853E−02 | 8.5990E−04 | 1.6526E−03 | −4.1044E−03 | 1.9146E−03 | 1.0301E−04 |
| A16 = | −5.0154E−02 | | 4.7280E−04 | 1.3376E−03 | −1.1994E−04 | −4.9278E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following relationships:

| 2nd Embodiment | | | |
|---|---|---|---|
| f [mm] | 4.17 | R12/R11 | 0.63 |
| Fno | 2.23 | R12/f2 | −0.34 |
| HFOV [deg.] | 34.5 | f/f5 | 0.05 |
| V5/V1 | 0.99 | \|f/f3\| + \|f/f5\| + \|f/f6\| | 0.42 |
| f/(CT3 + CT4 + CT5) | 4.39 | Yc61 [mm] | 0.77 |
| CT5/CT6 | 0.46 | | 1.73 |
| (T12 + T34 + T56)/(T23 + T45) | 0.34 | Yc62 [mm] | 1.38 |
| (R7 + R8)/(R7 − R8) | −1.34 | Yc62/f | 0.331 |
| (R9 − R10)/(R9 + R10) | −0.06 | | |

3rd Embodiment

Figure 3A:
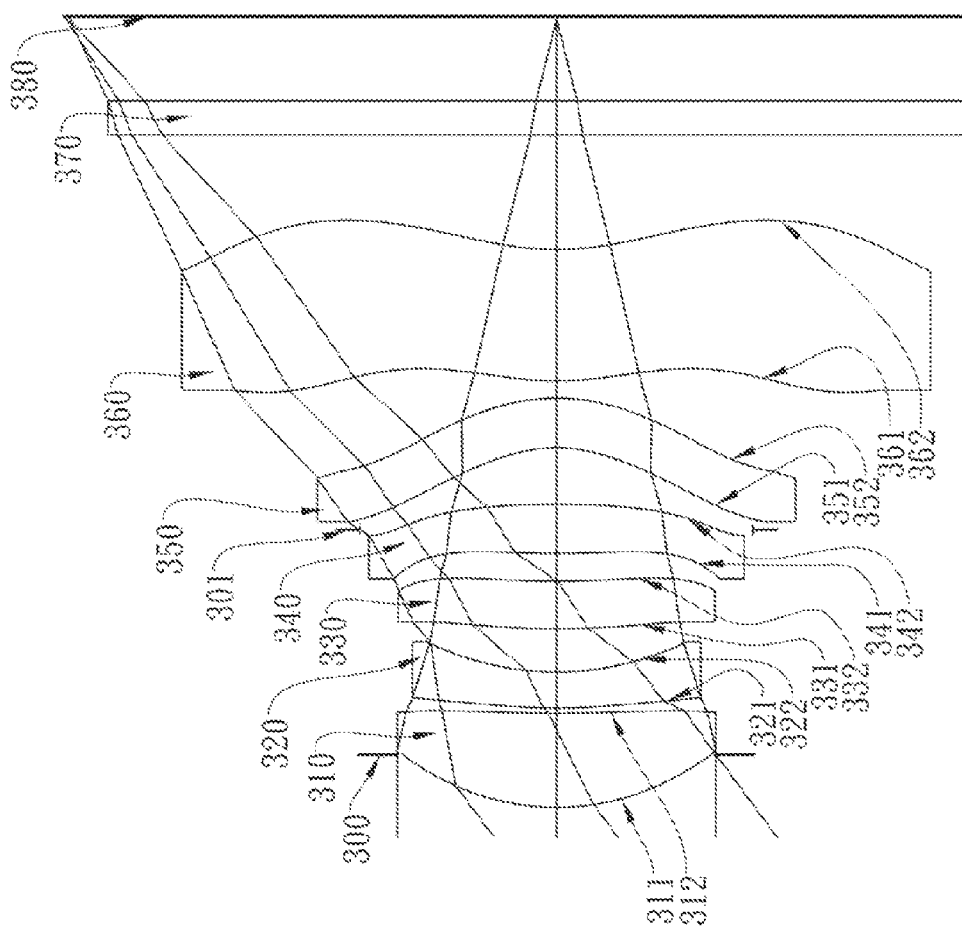
FIG. 3A is a schematic view of an optical image collecting system according to the 3rd embodiment of the present disclosure.
Figure 3B:
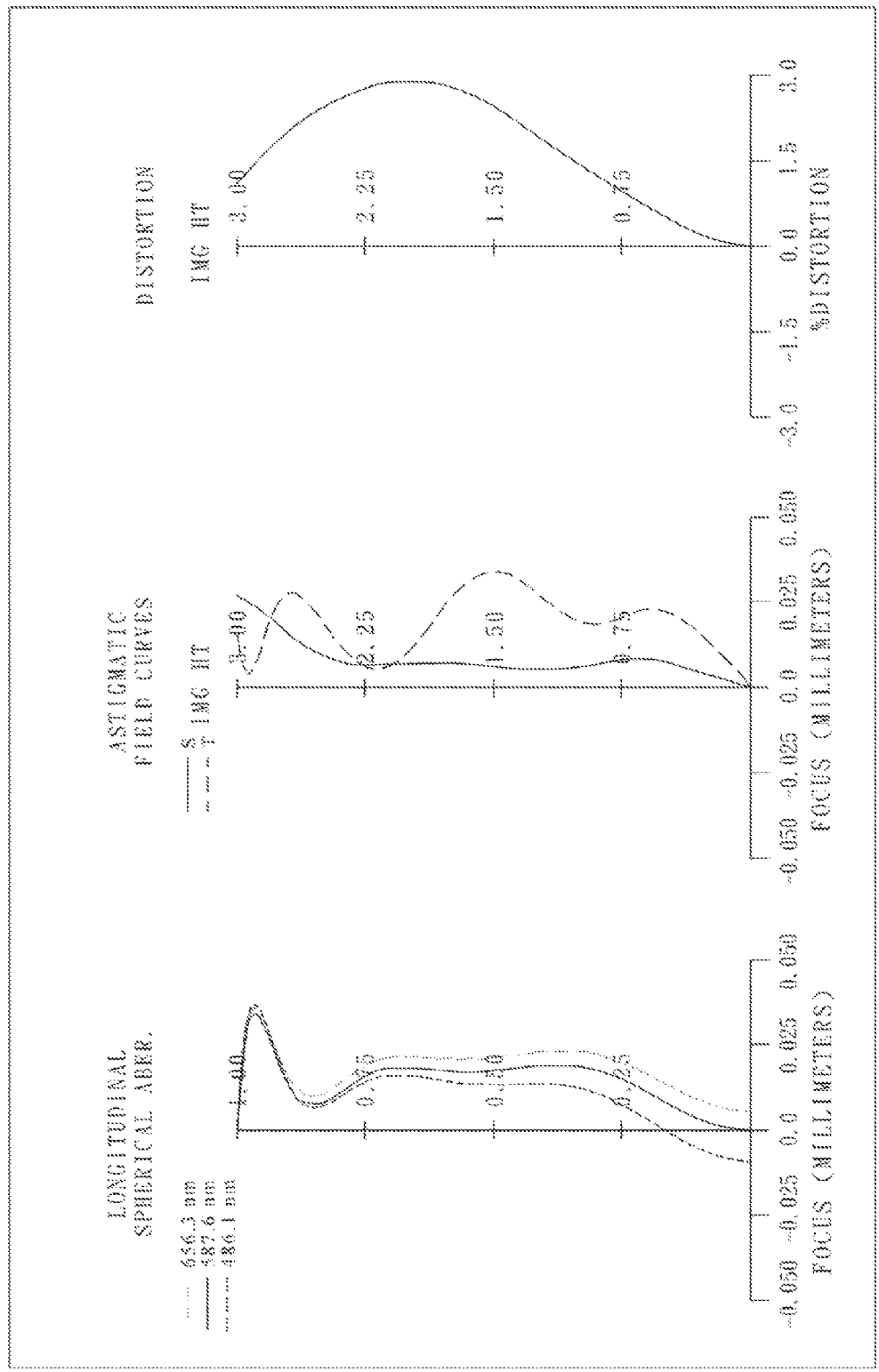
FIG. 3B shows, in order from left to right, spherical aberration curves, astigmatic field curves and a distortion curve of the optical image collecting system according to the 3rd embodiment.

FIG. 3A is a schematic view of an optical image collecting system according to the 3rd embodiment of the present disclosure. FIG. 3B shows, in order from left to right, spherical aberration curves, astigmatic field curves and a distortion curve of the optical image collecting system according to the 3rd embodiment. In FIG. 3A, the optical image collecting system includes, in order from an object side to an image side, an aperture stop 300, a first lens element 310, a second lens element 320, a third lens element 330, a fourth lens element 340, a stop 301, a fifth lens element 350, a sixth lens element 360, an IR-cut filter 370 and an image plane 380.

The first lens element 310 with positive refractive power has a convex object-side surface 311 at a paraxial region and a concave image-side surface 312 at a paraxial region, which are both aspheric, and the first lens element 310 is made of plastic material.

The second lens element 320 with negative refractive power has a convex object-side surface 321 at a paraxial region and a concave image-side surface 322 at a paraxial region, which are both aspheric, and the second lens element 320 is made of plastic material.

The third lens element 330 with positive refractive power has a convex object-side surface 331 at a paraxial region and a concave image-side surface 332 at a paraxial region, which are both aspheric, and the third lens element 330 is made of plastic material.

The fourth lens element 340 with positive refractive power has a convex object-side surface 341 at a paraxial region and a convex image-side surface 342 at a paraxial region, which are both aspheric, and the fourth lens element 340 is made of plastic material.

The fifth lens element 350 with negative refractive power has a concave object-side surface 351 at a paraxial region and a convex image-side surface 352 at a paraxial region, which are both aspheric, and the fifth lens element 350 is made of plastic material.

The sixth lens element 360 with positive refractive power has a convex object-side surface 361 at a paraxial region and a concave image-side surface 362 at a paraxial region which are both aspheric, and the sixth lens element 360 is made of plastic material. The image-side surface 362 changes from concave at the paraxial region to convex at a peripheral region.

The second lens element 320, the third lens element 330, the fourth lens element 340 and the fifth lens element 350 of the optical image collecting system all have a central thickness less than or equal to 0.300 mm. The IR-cut filter 370 is made of glass, and located between the sixth lens element 360 and the image plane 380, and will not affect the focal length of the optical image collecting system.

The detailed optical data of the 3rd embodiment are shown in Table 5 and the aspheric surface data are shown in Table 6 below.

TABLE 5

Embodiment 3
f = 3.99 mm, Fno = 2.05, HFOV = 36.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.320 | | | | |
| 2 | Lens 1 | 1.518 | ASP | 0.574 | Plastic | 1.544 | 55.9 | 3.36 |
| 3 | | 7.690 | ASP | 0.032 | | | | |
| 4 | Lens 2 | 3.200 | ASP | 0.220 | Plastic | 1.608 | 25.7 | −5.71 |
| 5 | | 1.622 | ASP | 0.264 | | | | |
| 6 | Lens 3 | 4.129 | ASP | 0.291 | Plastic | 1.544 | 55.9 | 105.07 |
| 7 | | 4.340 | ASP | 0.171 | | | | |
| 8 | Lens 4 | 5.973 | ASP | 0.300 | Plastic | 1.544 | 55.9 | 5.63 |
| 9 | | −6.171 | ASP | −0.155 | | | | |
| 10 | Stop | Plano | | 0.502 | | | | |
| 11 | Lens 5 | −0.856 | ASP | 0.300 | Plastic | 1.640 | 23.3 | −8.16 |
| 12 | | −1.163 | ASP | 0.104 | | | | |
| 13 | Lens 6 | 1.693 | ASP | 0.804 | Plastic | 1.530 | 55.8 | 25.09 |
| 14 | | 1.620 | ASP | 0.700 | | | | |
| 15 | IR-cut filter | Plano | | 0.210 | Glass | 1.517 | 64.2 | — |
| 16 | | Plano | | 0.515 | | | | |
| 17 | Image | Plano | | — | | | | |

Note:
Reference wavelength (d-line) is 587.6 nm.
Half of the diameter of the stop at Surface 10 is 1.200 mm.

TABLE 6

Aspheric Coefficients

| Surface # | 2 | 3 | 4 | 5 | 6 | 7 |
|---|---|---|---|---|---|---|
| k = | −6.8082E−02 | −9.0000E+01 | −2.8979E+01 | −4.8165E+00 | −6.3982E+01 | −7.1509E+01 |
| A4 = | 5.2646E−03 | −9.1931E−02 | −1.1312E−01 | 1.2883E−02 | −8.7138E−04 | −8.5582E−02 |
| A6 = | 1.4681E−02 | 1.4099E−01 | 1.1625E−01 | 4.2687E−02 | −3.6100E−02 | −2.8831E−02 |
| A8 = | −3.8348E−02 | −1.2107E−01 | 4.3337E−02 | 1.3285E−01 | −3.6813E−02 | −8.3923E−03 |
| A10 = | −1.6121E−02 | −4.9960E−04 | −1.4125E−01 | −2.1320E−01 | 3.3256E−02 | −2.7039E−02 |
| A12 = | 9.8487E−02 | 4.5857E−02 | 4.8755E−02 | 1.5378E−01 | −1.6291E−03 | −1.8195E−03 |
| A14 = | −7.7512E−02 | −3.6527E−02 | 1.5158E−02 | −2.4257E−02 | | |

| Surface # | 8 | 9 | 11 | 12 | 13 | 14 |
|---|---|---|---|---|---|---|
| k = | −7.0730E+01 | −5.3724E+01 | −4.2574E+00 | −7.4984E−01 | −1.4687E+01 | −7.1358E+00 |
| A4 = | −1.3698E−01 | −7.0733E−02 | −6.0385E−02 | 1.1235E−01 | −1.6170E−01 | −8.1049E−02 |
| A6 = | −6.4726E−02 | −7.2811E−02 | −1.5190E−02 | −3.2616E−02 | 9.1437E−02 | 3.2743E−02 |
| A8 = | −7.3839E−03 | 1.3632E−02 | 1.0822E−01 | 2.8664E−02 | −6.5692E−02 | −1.4037E−02 |
| A10 = | −4.8109E−02 | 3.3270E−02 | −4.7694E−02 | 8.9486E−03 | 3.8584E−02 | 4.4237E−03 |
| A12 = | 2.1077E−02 | 7.3272E−05 | −4.4410E−03 | −4.5683E−03 | −1.2207E−02 | −9.0020E−04 |
| A14 = | 6.1853E−02 | 8.9019E−04 | 2.9103E−03 | −3.6464E−03 | 1.9099E−03 | 1.0338E−04 |
| A16 = | −4.8470E−02 | | 8.7373E−04 | 1.2189E−03 | −1.1798E−04 | −4.9012E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following relationships:

| 3rd Embodiment | | | |
|---|---|---|---|
| f [mm] | 3.99 | R12/R11 | 0.96 |
| Fno | 2.05 | R12/f2 | −0.28 |
| HFOV [deg.] | 36.6 | f/f5 | −0.49 |
| V5/V1 | 0.42 | |f/f3| + |f/f5| + |f/f6| | 0.69 |
| f/(CT3 + CT4 + CT5) | 4.48 | Yc61 [mm] | 0.82 |
| CT5/CT6 | 0.37 | | 1.78 |
| (T12 + T34 + T56)/(T23 + T45) | 0.50 | Yc62 [mm] | 1.28 |
| (R7 + R8)/(R7 − R8) | −0.02 | Yc62/f | 0.321 |
| (R9 − R10)/(R9 + R10) | −0.15 | | |

4th Embodiment

Figure 4B:
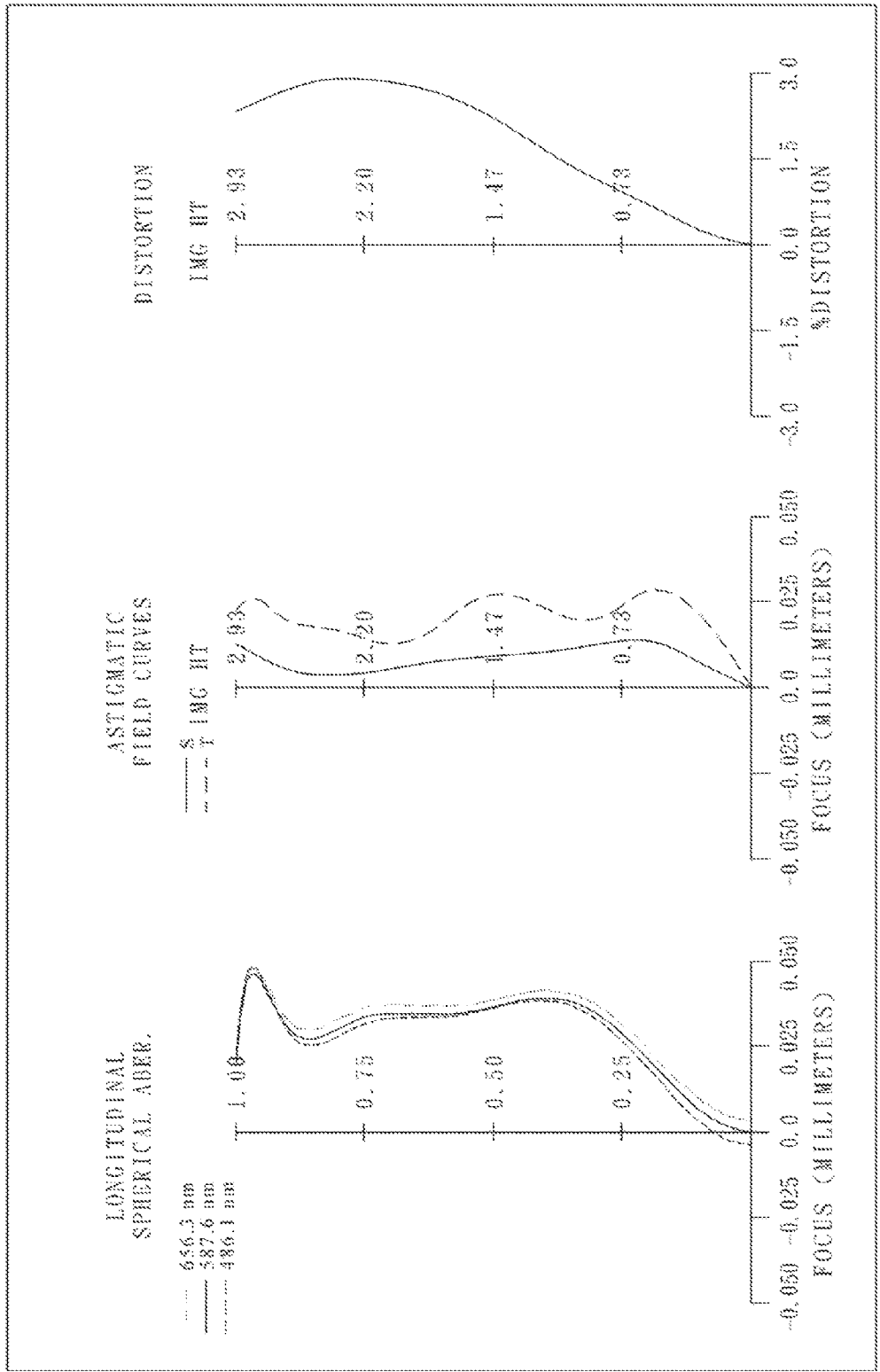
FIG. 4B shows, in order from left to right, spherical aberration curves, astigmatic field curves and a distortion curve of the optical image collecting system according to the 4th embodiment.

FIG. 4A is a schematic view of an optical image collecting system according to the 4th embodiment of the present disclosure. FIG. 4B shows, in order from left to right, spherical aberration curves, astigmatic field curves and a distortion curve of the optical image collecting system according to the 4th embodiment. In FIG. 4A, the optical image collecting system includes, in order from an object side to an image side, an aperture stop 400, a first lens element 410, a second lens element 420, a third lens element 430, a fourth lens element 440, a fifth lens element 450, a sixth lens element 460, an IR-cut filter 470 and an image plane 480.

The first lens element 410 with positive refractive power has a convex object-side surface 411 at a paraxial region and a convex image-side surface 412 at a paraxial region, which are both aspheric, and the first lens element 410 is made of plastic material.

The second lens element 420 with negative refractive power has a convex object-side surface 421 at a paraxial region and a concave image-side surface 422 at a paraxial region, which are both aspheric, and the second lens element 420 is made of plastic material.

The third lens element 430 with negative refractive power has a concave object-side surface 431 at a paraxial region and a convex image-side surface 432 at a paraxial region, which are both aspheric, and the third lens element 430 is made of plastic material.

The fourth lens element 440 with positive refractive power has a convex object-side surface 441 at a paraxial region and a convex image-side surface 442 at a paraxial region, which are both aspheric, and the fourth lens element 440 is made of plastic material.

The fifth lens element 450 with negative refractive power has a concave object-side surface 451 at a paraxial region and a convex image-side surface 452 at a paraxial region, which are both aspheric, and the fifth lens element 450 is made of plastic material.

The sixth lens element 460 with positive refractive power has a convex object-side surface 461 at a paraxial region and a concave image-side surface 462 at a paraxial region which are both aspheric, and the sixth lens element 460 is made of plastic material. The image-side surface 462 changes from concave at the paraxial region to convex at a peripheral region.

The second lens element 420, the third lens element 430, the fourth lens element 440 and the fifth lens element 450 of the optical image collecting system all have a central thickness less than or equal to 0.300 mm. The IR-cut filter 470 is made of glass and located between the sixth lens element 460 and the image plane 480, and will not affect the focal length of the optical image collecting system.

The detailed optical data of the 4th embodiment are shown in Table 7 and the aspheric surface data are shown in Table 8 below.

TABLE 7

Embodiment 4
f = 4.21 mm, Fno = 2.20, HFOV = 34.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.272 | | | | |
| 2 | Lens 1 | 1.682 | ASP | 0.573 | Plastic | 1.535 | 56.3 | 3.02 |
| 3 | | −35.920 | ASP | 0.030 | | | | |
| 4 | Lens 2 | 3.131 | ASP | 0.221 | Plastic | 1.634 | 23.8 | −5.66 |
| 5 | | 1.627 | ASP | 0.332 | | | | |
| 6 | Lens 3 | −12.178 | ASP | 0.300 | Plastic | 1.544 | 55.9 | −27.44 |
| 7 | | −66.667 | ASP | 0.125 | | | | |
| 8 | Lens 4 | 14.245 | ASP | 0.245 | Plastic | 1.544 | 55.9 | 5.80 |
| 9 | | −4.027 | ASP | 0.487 | | | | |
| 10 | Lens 5 | −0.793 | ASP | 0.300 | Plastic | 1.632 | 23.4 | −7.59 |
| 11 | | −1.089 | ASP | 0.024 | | | | |
| 12 | Lens 6 | 1.979 | ASP | 0.994 | Plastic | 1.530 | 55.8 | 26.07 |
| 13 | | 1.908 | ASP | 0.700 | | | | |
| 14 | IR-cut filter | Plano | | 0.210 | Glass | 1.517 | 64.2 | — |
| 15 | | Plano | | 0.561 | | | | |
| 16 | Image | Plano | | — | | | | |

Note:
Reference wavelength (d-line) is 587.6 nm.

TABLE 8

Aspheric Coefficients

| Surface # | 2 | 3 | 4 | 5 | 6 | 7 |
|---|---|---|---|---|---|---|
| k = | −1.0615E−01 | −6.6567E+01 | −3.4059E+01 | −5.3817E+00 | −7.2774E+01 | −9.0000E+01 |
| A4 = | 4.1308E−04 | −6.4069E−02 | −8.0013E−02 | −2.2565E−02 | −3.0566E−02 | −7.8672E−02 |
| A6 = | 2.1693E−02 | 1.5537E−01 | 8.9032E−02 | 5.7639E−03 | −3.1641E−02 | −4.8579E−02 |
| A8 = | −4.8647E−02 | −1.6144E−01 | 5.4498E−02 | 1.7950E−01 | −5.9873E−03 | 2.7254E−02 |
| A10 = | −1.3030E−02 | 1.1494E−02 | −1.7154E−01 | −2.7242E−01 | 5.3973E−02 | −2.5481E−02 |
| A12 = | 9.8487E−02 | 4.5857E−02 | 4.8755E−02 | 1.5378E−01 | −1.6291E−03 | −1.8195E−03 |
| A14 = | −7.7512E−02 | −3.6527E−02 | 1.5158E−02 | −2.4257E−02 | −1.8704E−08 | −1.8717E−08 |

| Surface # | 8 | 9 | 10 | 11 | 12 | 13 |
|---|---|---|---|---|---|---|
| k = | −8.8698E+01 | −1.4431E+00 | −3.9422E+00 | −8.0203E−01 | −2.3892E+01 | −8.5625E+00 |
| A4 = | −1.3676E−01 | −6.2851E−02 | −6.3911E−02 | 1.3759E−01 | −1.5806E−01 | −7.1602E−02 |
| A6 = | −7.9805E−02 | −4.5333E−02 | 1.1734E−02 | −4.6276E−02 | 9.3113E−02 | 3.0643E−02 |
| A8 = | 4.7886E−02 | 2.5667E−02 | 1.0096E−01 | 2.9419E−02 | −6.5765E−02 | −1.3830E−02 |
| A10 = | −6.5377E−02 | 3.9365E−02 | −5.4821E−02 | 9.9451E−03 | 3.8522E−02 | 4.4535E−03 |
| A12 = | 2.1077E−02 | −6.5484E−03 | −3.6585E−03 | −4.5324E−03 | −1.2227E−02 | −9.0560E−04 |
| A14 = | 6.1853E−02 | 8.9017E−04 | 4.9331E−03 | −3.7580E−03 | 1.9054E−03 | 1.0206E−04 |
| A16 = | −4.8470E−02 | −6.8644E−09 | −5.2009E−04 | 1.2345E−03 | −1.1616E−04 | −4.7674E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following relationships:

| 4th Embodiment | | | |
|---|---|---|---|
| f [mm] | 4.21 | R12/R11 | 0.96 |
| Fno | 2.20 | R12/f2 | −0.34 |
| HFOV [deg.] | 34.1 | f/f5 | −0.55 |
| V5/V1 | 0.42 | |f/f3| + |f/f5| + |f/f6| | 0.87 |
| f/(CT3 + CT4 + CT5) | 4.98 | Yc61 [mm] | 0.75 |
| CT5/CT6 | 0.30 | | |

-continued

| 4th Embodiment | | | |
|---|---|---|---|
| (T12 + T34 + T56)/(T23 + T45) | 0.22 | Yc62 [mm] | 1.29 |
| (R7 + R8)/(R7 − R8) | 0.56 | Yc62/f | 0.307 |
| (R9 − R10)/(R9 + R10) | −0.16 | | |

5th Embodiment

Figure 5A:
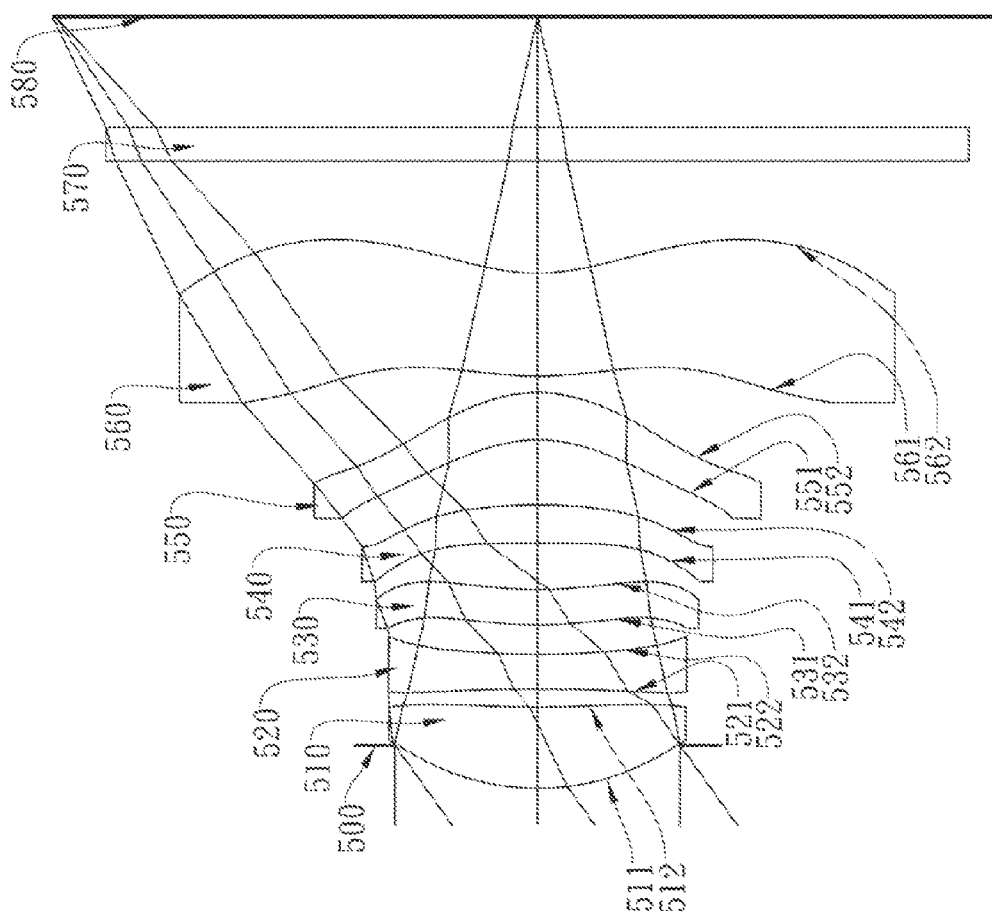
FIG. 5A is a schematic view of an optical image collecting system according to the 5th embodiment of the present disclosure.
Figure 5B:
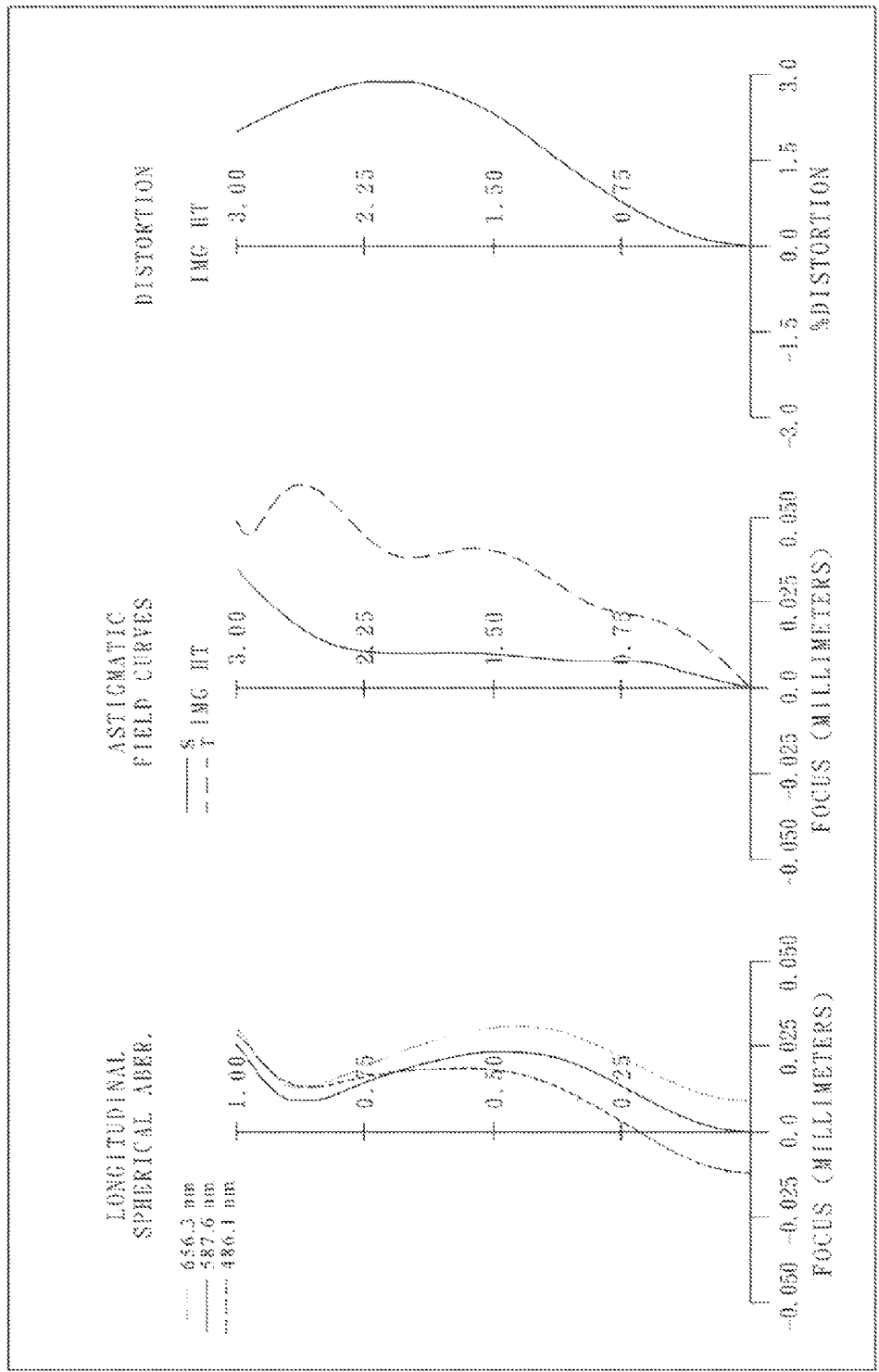
FIG. 5B shows, in order from left to right, spherical aberration curves, astigmatic field curves and a distortion curve of the optical image collecting system according to the 5th embodiment.

FIG. 5A is a schematic view of an optical image collecting system according to the 5th embodiment of the present disclosure. FIG. 5B shows, in order from left to right, spherical aberration curves, astigmatic field curves and a distortion curve of the optical image collecting system according to the 5th embodiment. In FIG. 5A, the optical image collecting system includes, in order from an object side to an image side, an aperture stop 500, a first lens element 510, a second lens element 520, a third lens element 530, a fourth lens element 540, a fifth lens element 550, a sixth lens element 560, an IR-cut filter 570 and an image plane 580.

The first lens element 510 with positive refractive power has a convex object-side surface 511 at a paraxial region and a concave image-side surface 512 at a paraxial region, which are both aspheric, and the first lens element 510 is made of plastic material.

The second lens element 520 with negative refractive power has a concave object-side surface 521 at a paraxial region and a concave image-side surface 522 at a paraxial region, which are both aspheric, and the second lens element 520 is made of plastic material.

The third lens element 530 with positive refractive power has a convex object-side surface 531 at a paraxial region and a concave image-side surface 532 at a paraxial region, which are both aspheric, and the third lens element 530 is made of plastic material.

The fourth lens element 540 with positive refractive power has a concave object-side surface 541 at a paraxial region and a convex image-side surface 542 at a paraxial region, which are both aspheric, and the fourth lens element 540 is made of plastic material.

The fifth lens element 550 with positive refractive power has a concave object-side surface 551 at a paraxial region and a convex image-side surface 552 at a paraxial region, which are both aspheric, and the fifth lens element 550 is made of plastic material.

The sixth lens element 560 with negative refractive power has a convex object-side surface 561 at a paraxial region and a concave image-side surface 562 at a paraxial region which are both aspheric, and the sixth lens element 560 is made of plastic material. The image-side surface 562 changes from concave at the paraxial region to convex at a peripheral region.

The second lens element 520, the third lens element 530, the fourth lens element 540 and the fifth lens element 550 of the optical image collecting system all have a central thickness less than or equal to 0.300 mm. The IR-cut filter 570 is made of glass and located between the sixth lens element 560 and the image plane 580, and will not affect the focal length of the optical image collecting system.

The detailed optical data of the 5th embodiment are shown in Table 9 and the aspheric surface data are shown in Table 10 below.

TABLE 9

Embodiment 5
f = 4.09 mm, Fno = 2.30, HFOV = 35.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.269 | | | | |
| 2 | Lens 1 | 1.495 | ASP | 0.508 | Plastic | 1.535 | 56.3 | 3.51 |
| 3 | | 6.518 | ASP | 0.111 | | | | |
| 4 | Lens 2 | −24.155 | ASP | 0.218 | Plastic | 1.650 | 21.4 | −6.76 |
| 5 | | 5.385 | ASP | 0.184 | | | | |
| 6 | Lens 3 | 2.482 | ASP | 0.221 | Plastic | 1.535 | 56.3 | 97.06 |
| 7 | | 2.525 | ASP | 0.290 | | | | |
| 8 | Lens 4 | −27.740 | ASP | 0.237 | Plastic | 1.535 | 56.3 | 8.16 |
| 9 | | −3.781 | ASP | 0.407 | | | | |
| 10 | Lens 5 | −0.902 | ASP | 0.292 | Plastic | 1.535 | 56.3 | 13.28 |
| 11 | | −0.890 | ASP | 0.102 | | | | |
| 12 | Lens 6 | 2.042 | ASP | 0.643 | Plastic | 1.530 | 55.8 | −7.16 |
| 13 | | 1.183 | ASP | 0.700 | | | | |
| 14 | IR-cut filter | Plano | | 0.210 | Glass | 1.517 | 64.2 | — |
| 15 | | Plano | | 0.691 | | | | |
| 16 | Image | Plano | | — | | | | |

Note:
Reference wavelength (d-line) is 587.6 nm.

TABLE 10

Aspheric Coefficients

| Surface # | 2 | 3 | 4 | 5 | 6 | 7 |
|---|---|---|---|---|---|---|
| k = | −1.7906E−01 | 1.1516E+01 | 1.2496E+01 | −3.2387E+01 | −1.3840E+01 | −1.0390E+01 |
| A4 = | −1.6107E−03 | −1.1002E−01 | −7.7901E−02 | −2.5621E−03 | −1.1122E−01 | −1.0872E−01 |
| A6 = | 1.2898E−02 | 3.1506E−02 | 7.0273E−02 | 4.8551E−02 | −6.9195E−02 | −7.9400E−02 |
| A8 = | −6.8245E−03 | −6.3145E−04 | 9.0482E−02 | 1.2362E−01 | −7.8763E−02 | −7.1256E−03 |
| A10 = | −5.5725E−02 | −3.4953E−02 | −1.2454E−01 | −2.1990E−01 | 4.9405E−02 | −1.5724E−02 |
| A12 = | 9.8453E−02 | 4.5924E−02 | 4.8588E−02 | 1.5433E−01 | −1.9139E−03 | −1.6707E−03 |
| A14 = | −7.7512E−02 | −3.6527E−02 | 1.5158E−02 | −2.4257E−02 | −1.0945E−07 | −1.0952E−07 |

| Surface # | 8 | 9 | 10 | 11 | 12 | 13 |
|---|---|---|---|---|---|---|
| k = | −4.0000E+01 | 7.2066E+00 | −3.7935E+00 | −9.8665E−01 | −1.9388E+01 | −7.0245E+00 |
| A4 = | −1.5695E−01 | −7.9263E−02 | −4.4192E−02 | 1.7656E−01 | −1.6750E−01 | −9.1811E−02 |
| A6 = | −1.0828E−01 | −8.3996E−02 | 3.0363E−02 | −4.7737E−02 | 9.2584E−02 | 3.7813E−02 |
| A8 = | 2.9347E−03 | 2.0451E−02 | 7.6033E−02 | 3.2499E−02 | −6.5262E−02 | −1.5147E−02 |
| A10 = | 1.8161E−02 | 4.6808E−02 | −6.5663E−02 | 8.1716E−03 | 3.8591E−02 | 4.4874E−03 |

TABLE 10-continued

| Aspheric Coefficients | | | | | | |
|---|---|---|---|---|---|---|
| A12 = | 2.1053E−02 | 1.4203E−02 | 1.0774E−03 | −6.6387E−03 | −1.2265E−02 | −8.8932E−04 |
| A14 = | 6.1853E−02 | 8.6631E−04 | 8.7913E−03 | −4.2885E−03 | 1.8974E−03 | 1.0321E−04 |
| A16 = | −4.8470E−02 | −2.1257E−05 | −2.7561E−03 | 1.6548E−03 | −1.1377E−04 | −5.1907E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following relationships:

| 5th Embodiment | | | |
|---|---|---|---|
| f [mm] | 4.09 | R12/R11 | 0.58 |
| Fno | 2.30 | R12/f2 | −0.18 |
| HFOV [deg.] | 35.6 | f/f5 | 0.31 |
| V5/V1 | 1.00 | |f/f3| + |f/f5| + |f/f6| | 0.92 |
| f/(CT3 + CT4 + CT5) | 5.45 | Yc61 [mm] | 0.75 |
| CT5/CT6 | 0.45 | | — |
| (T12 + T34 + T56)/(T23 + T45) | 0.85 | Yc62 [mm] | 1.27 |
| (R7 + R8)/(R7 − R8) | 1.32 | Yc62/f | 0.311 |
| (R9 − R10)/(R9 + R10) | 0.01 | | |

6th Embodiment

Figure 6A:
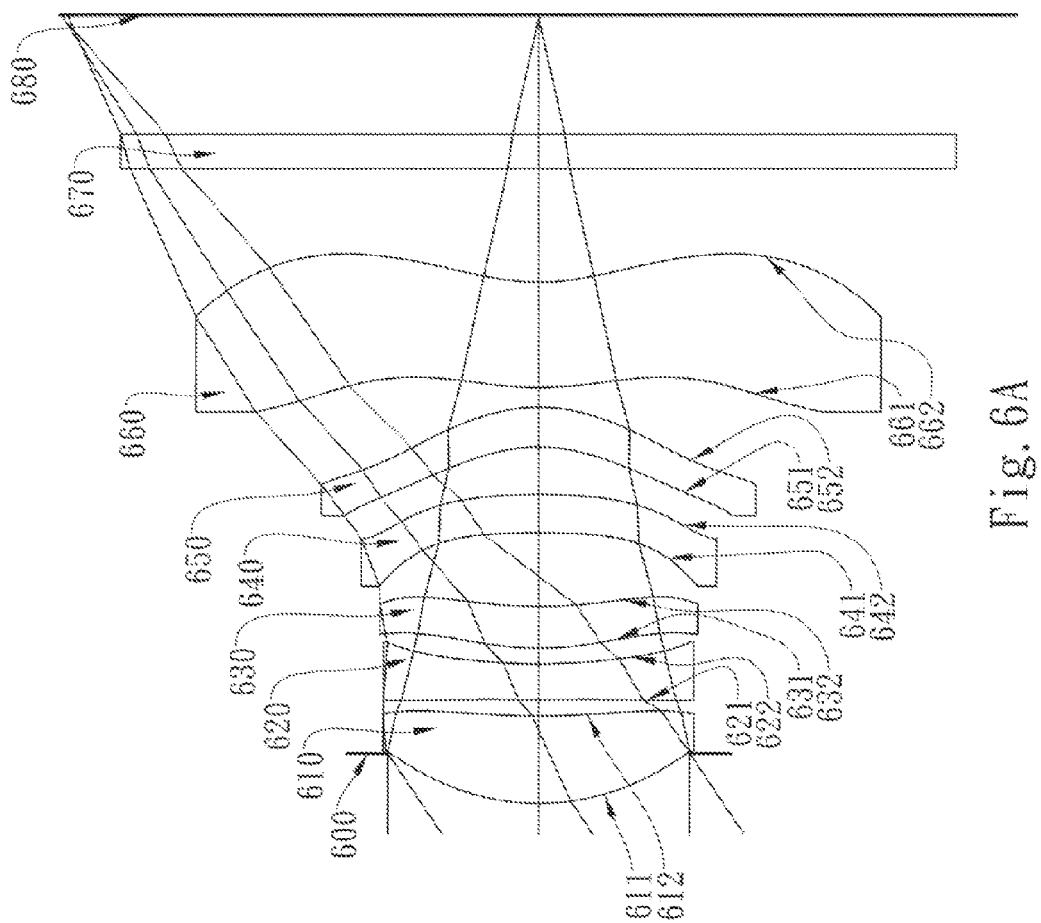
FIG. 6A is a schematic view of an optical image collecting system according to the 6th embodiment of the present disclosure.
Figure 6B:
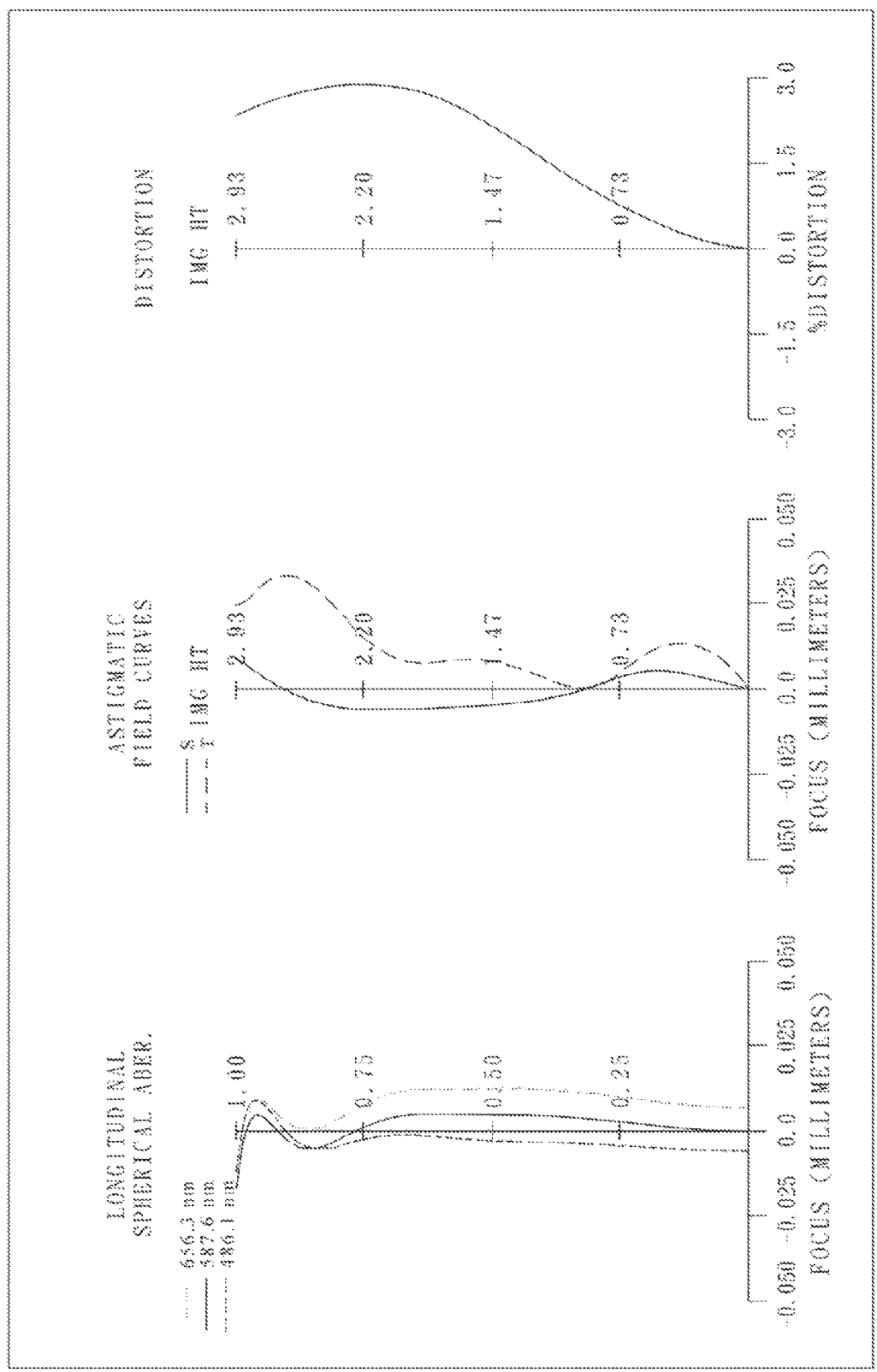
FIG. 6B shows, in order from left to right, spherical aberration curves, astigmatic field curves and a distortion curve of the optical image collecting system according to the 6th embodiment.

FIG. 6A is a schematic view of an optical image collecting system according to the 6th embodiment of the present disclosure. FIG. 6B shows, in order from left to right, spherical aberration curves, astigmatic field curves and a distortion curve of the optical image collecting system according to the 6th embodiment. In FIG. 6A, the optical image collecting system includes, in order from an object side to an image side, an aperture stop 600, a first lens element 610, a second lens element 620, a third lens element 630, a fourth lens element 640, a fifth lens element 650, a sixth lens element 660, an IR-cut filter 670 and an image plane 680.

The first lens element 610 with positive refractive power has a convex object-side surface 611 at a paraxial region and a concave image-side surface 612 at a paraxial region, which are both aspheric, and the first lens element 610 is made of plastic material.

The second lens element 620 with negative refractive power has a convex object-side surface 621 at a paraxial region and a concave image-side surface 622 at a paraxial region, which are both aspheric, and the second lens element 620 is made of plastic material.

The third lens element 630 with positive refractive power has a convex object-side surface 631 at a paraxial region and a concave image-side surface 632 at a paraxial region, which are both aspheric, and the third lens element 630 is made of plastic material.

The fourth lens element 640 with positive refractive power has a concave object-side surface 641 at a paraxial region and a convex image-side surface 642 at a paraxial region, which are both aspheric, and the fourth lens element 640 is made of plastic material.

The fifth lens element 650 with positive refractive power has a concave object-side surface 651 at a paraxial region and a convex image-side surface 652 at a paraxial region, which are both aspheric, and the fifth lens element 650 is made of plastic material.

The sixth lens element 660 with negative refractive power has a convex object-side surface 661 at a paraxial region and a concave image-side surface 662 at a paraxial region which are both aspheric, and the sixth lens element 660 is made of plastic material. The image-side surface 662 changes from concave at the paraxial region to convex at a peripheral region.

The second lens element 620, the third lens element 630, the fourth lens element 640 and the fifth lens element 650 of the optical image collecting system all have a central thickness less than or equal to 0.300 mm. The IR-cut filter 670 is made of glass and located between the sixth lens element 660 and the image plane 680, and will not affect the focal length of the optical image collecting system.

The detailed optical data of the 6th embodiment are shown in Table 11 and the aspheric surface data are shown in Table 12 below.

TABLE 11

Embodiment 6
f = 4.27 mm, Fno = 2.30, HFOV = 33.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.307 | | | | |
| 2 | Lens 1 | 1.460 | ASP | 0.538 | Plastic | 1.535 | 55.7 | 3.78 |
| 3 | | 4.578 | ASP | 0.100 | | | | |
| 4 | Lens 2 | 37.283 | ASP | 0.221 | Plastic | 1.650 | 21.4 | −5.78 |
| 5 | | 3.402 | ASP | 0.097 | | | | |
| 6 | Lens 3 | 1.787 | ASP | 0.257 | Plastic | 1.535 | 56.3 | 9.00 |
| 7 | | 2.701 | ASP | 0.453 | | | | |
| 8 | Lens 4 | −6.238 | ASP | 0.237 | Plastic | 1.535 | 56.3 | 22.53 |
| 9 | | −4.164 | ASP | 0.294 | | | | |
| 10 | Lens 5 | −0.933 | ASP | 0.240 | Plastic | 1.607 | 26.6 | 625.23 |

TABLE 11-continued

Embodiment 6
f = 4.27 mm, Fno = 2.30, HFOV = 33.8 deg.

| Surface # | | Curvature Radius | | Thickness | Material | Index | Abbe # | Focal Length |
|---|---|---|---|---|---|---|---|---|
| 11 | | −1.021 | ASP | 0.121 | | | | |
| 12 | Lens 6 | 1.770 | ASP | 0.650 | Plastic | 1.535 | 55.7 | −21.78 |
| 13 | | 1.340 | ASP | 0.700 | | | | |
| 14 | IR-cut filter | Plano | | 0.210 | Glass | 1.517 | 64.2 | — |
| 15 | | Plano | | 0.736 | | | | |
| 16 | Image | Plano | | — | | | | |

Note:
Reference wavelength (d-line) is 587.6 nm.

TABLE 12

Aspheric Coefficients

| Surface # | 2 | 3 | 4 | 5 | 6 | 7 |
|---|---|---|---|---|---|---|
| k = | −1.5789E−01 | 9.8264E+00 | −2.0000E+01 | −4.4564E+01 | −9.3213E+00 | −2.5265E+00 |
| A4 = | 1.3312E−03 | −1.0176E−01 | −7.3988E−02 | −2.0147E−03 | −6.9483E−02 | −8.9538E−02 |
| A6 = | 4.3120E−03 | −2.5662E−02 | 4.4700E−02 | 7.3008E−02 | −3.6331E−02 | −8.0196E−02 |
| A8 = | −3.5576E−03 | 3.1236E−02 | 8.2757E−02 | 9.1472E−02 | −5.9184E−02 | −1.1916E−03 |
| A10 = | −4.7508E−02 | −4.3665E−02 | −1.2312E−01 | −2.0877E−01 | 5.2136E−02 | −2.3481E−03 |
| A12 = | 9.8917E−02 | 4.4267E−02 | 4.7237E−02 | 1.5351E−01 | 1.1726E−03 | −2.2948E−03 |
| A14 = | −7.7515E−02 | −3.6527E−02 | 1.5158E−02 | −2.4257E−02 | −9.6459E−08 | 4.8493E−04 |

| Surface # | 8 | 9 | 10 | 11 | 12 | 13 |
|---|---|---|---|---|---|---|
| k = | 2.0000E+01 | 7.0462E+00 | −4.9192E+00 | −9.0498E−01 | −1.7668E+01 | −7.7301E+00 |
| A4 = | −1.8637E−01 | −1.2337E−01 | −5.4909E−02 | 1.6486E−01 | −1.7132E−01 | −9.6171E−02 |
| A6 = | −1.0089E−01 | −7.1589E−02 | 3.0098E−02 | −4.5101E−02 | 9.3346E−02 | 3.8148E−02 |
| A8 = | −2.7555E−02 | 2.8393E−02 | 7.9668E−02 | 3.2699E−02 | −6.5169E−02 | −1.5307E−02 |
| A10 = | 2.4508E−02 | 4.4011E−02 | −6.4772E−02 | 7.3535E−03 | 3.8534E−02 | 4.4882E−03 |
| A12 = | 2.1076E−02 | 1.0005E−03 | 1.0200E−03 | −6.9035E−03 | −1.2281E−02 | −8.8722E−04 |
| A14 = | 6.2486E−02 | 1.0492E−03 | 8.3706E−03 | −4.2722E−03 | 1.8962E−03 | 1.0305E−04 |
| A16 = | −4.8372E−02 | 1.6203E−04 | −2.7910E−03 | 1.7052E−03 | −1.1233E−04 | −5.2749E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following relationships:

| 6th Embodiment | | | |
|---|---|---|---|
| f [mm] | 4.27 | R12/R11 | 0.76 |
| Fno | 2.30 | R12/f2 | −0.23 |
| HFOV [deg.] | 33.8 | f/f5 | 0.01 |
| V5/V1 | 0.48 | \|f/f3\| + \|f/f5\| + \|f/f6\| | 0.68 |
| f/(CT3 + CT4 + CT5) | 5.82 | Yc61 [mm] | 0.77 |
| CT5/CT6 | 0.37 | | — |
| (T12 + T34 + T56)/(T23 + T45) | 1.72 | Yc62 [mm] | 1.18 |
| (R7 + R8)/(R7 − R8) | 5.02 | Yc62/f | 0.276 |
| (R9 − R10)/(R9 + R10) | −0.05 | | |

7th Embodiment

Figure 7A:
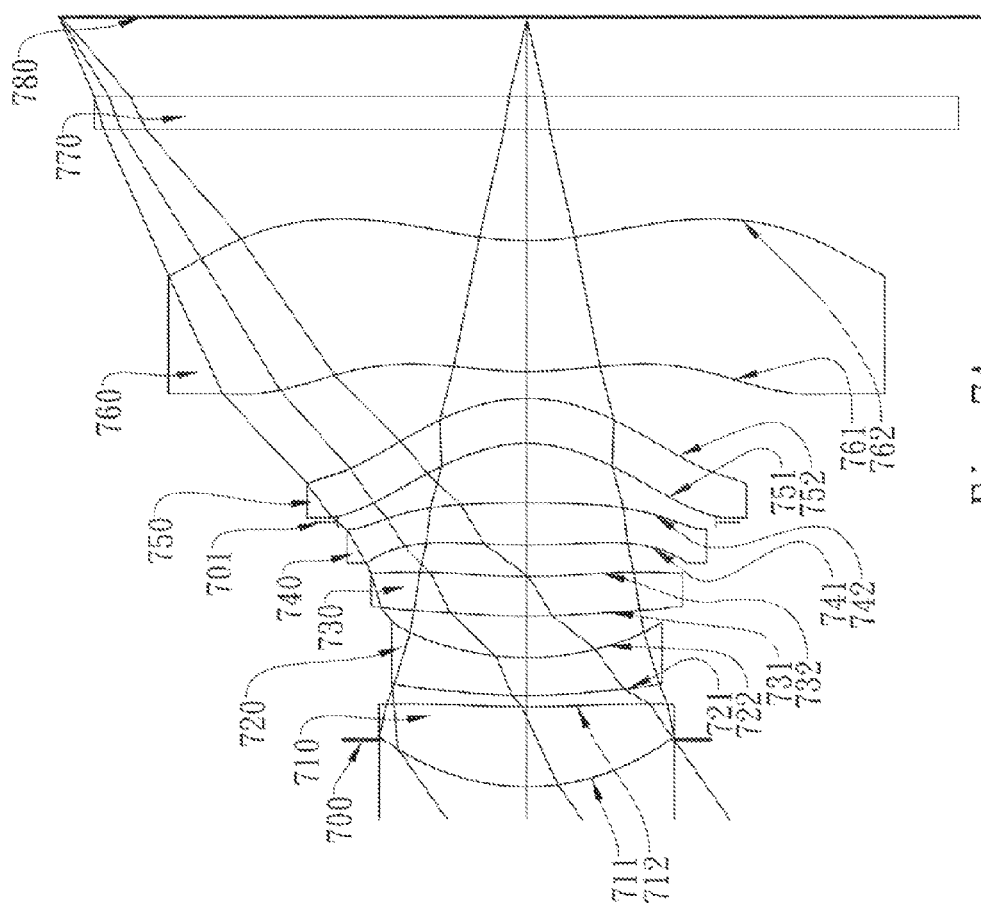
FIG. 7A is a schematic view of an optical image collecting system according to the 7th embodiment of the present disclosure.
Figure 7B:
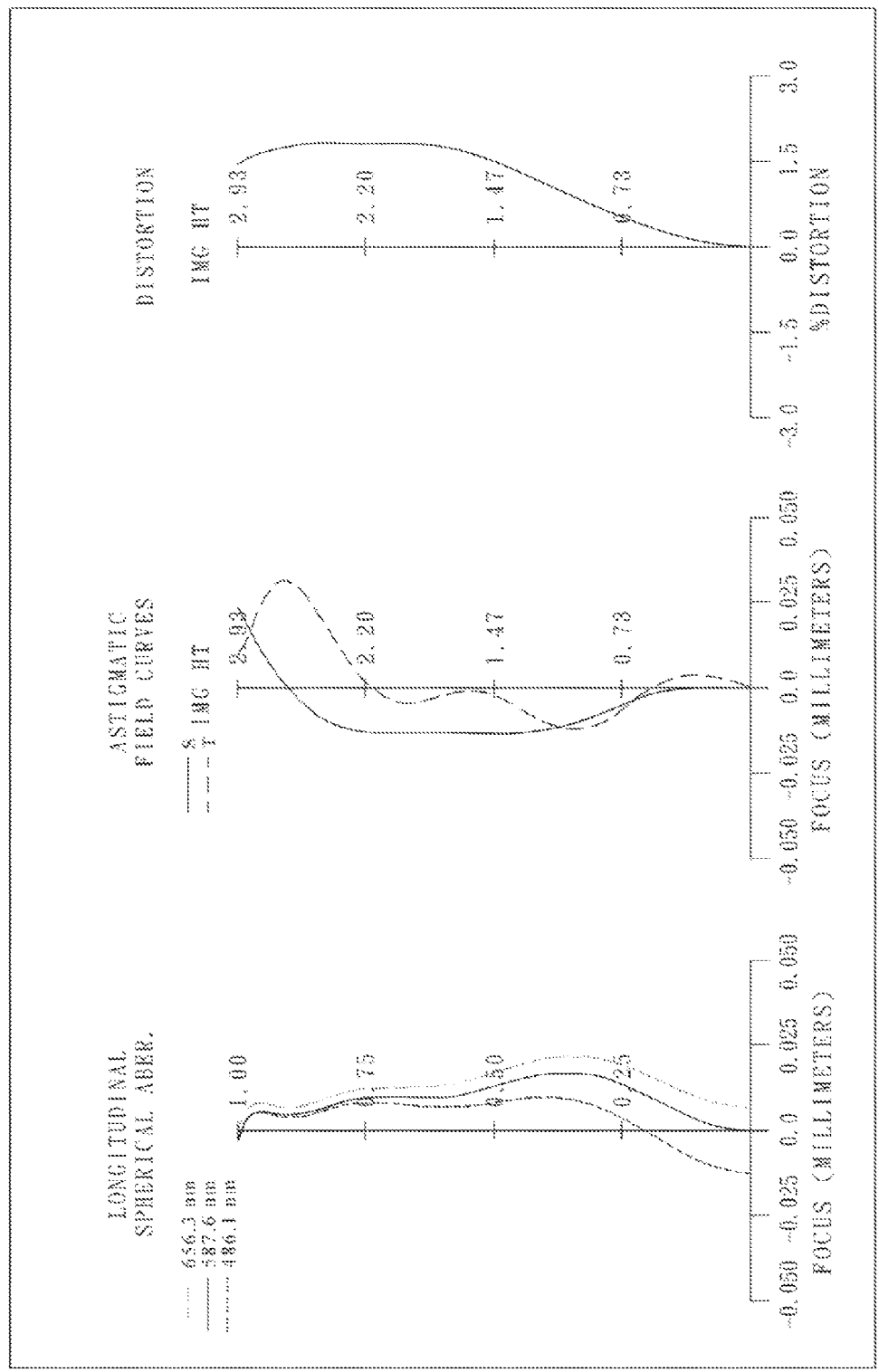
FIG. 7B shows, in order from left to right, spherical aberration curves, astigmatic field curves and a distortion curve of the optical image collecting system according to the 7th embodiment.

FIG. 7A is a schematic view of an optical image collecting system according to the 7th embodiment of the present disclosure. FIG. 7B shows, in order from left to right, spherical aberration curves, astigmatic field curves and a distortion curve of the optical image collecting system according to the 7th embodiment. In FIG. 13, the optical image collecting system includes, in order from an object side to an image side, an aperture stop 700, a first lens element 710, a second lens element 720, a third lens element 730, a fourth lens element 740, a stop 701, a fifth lens element 750, a sixth lens element 760, an IR-cut filter 770 and an image plane 780.

The first lens element 710 with positive refractive power has a convex object-side surface 711 at a paraxial region and a concave image-side surface 712 at a paraxial region, which are both aspheric, and the first lens element 710 is made of plastic material.

The second lens element 720 with negative refractive power has a convex object-side surface 721 at a paraxial region and a concave image-side surface 722 at a paraxial region, which are both aspheric, and the second lens element 720 is made of plastic material.

The third lens element 730 with negative refractive power has a convex object-side surface 731 at a paraxial region and a concave image-side surface 732 at a paraxial region, which are both aspheric, and the third lens element 730 is made of plastic material.

The fourth lens element 740 with positive refractive power has a convex object-side surface 741 at a paraxial region and a convex image-side surface 742 at a paraxial region, which are both aspheric, and the fourth lens element 740 is made of plastic material.

The fifth lens element 750 with negative refractive power has a concave object-side surface 751 at a paraxial region and a convex image-side surface 752 at a paraxial region, which are both aspheric, and the fifth lens element 750 is made of plastic material.

The sixth lens element 760 with negative refractive power has a convex object-side surface 761 at a paraxial region and a concave image-side surface 762 at a paraxial region which are both aspheric, and the sixth lens element 760 is made of plastic material. The image-side surface 762 changes from concave at the paraxial region to convex at a peripheral region.

The second lens element 720, the third lens element 730, the fourth lens element 740 and the fifth lens element 750 of the optical image collecting system all have a central thickness less than or equal to 0.300 mm. The IR-cut filter 770 is made of glass and located between the sixth lens element 760 and the image plane 780, and will not affect the focal length of the optical image collecting system.

The detailed optical data of the 7th embodiment are shown in Table 13 and the aspheric surface data are shown in Table 14 below.

TABLE 13

Embodiment 7
f = 4.14 mm, Fno = 2.23, HFOV = 34.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.293 | | | | |
| 2 | Lens 1 | 1.487 | ASP | 0.505 | Plastic | 1.544 | 55.9 | 3.35 |
| 3 | | 7.102 | ASP | 0.068 | | | | |
| 4 | Lens 2 | 2.927 | ASP | 0.240 | Plastic | 1.640 | 23.3 | −6.01 |
| 5 | | 1.609 | ASP | 0.262 | | | | |
| 6 | Lens 3 | 4.311 | ASP | 0.250 | Plastic | 1.544 | 55.9 | −71.95 |
| 7 | | 3.804 | ASP | 0.198 | | | | |
| 8 | Lens 4 | 4.564 | ASP | 0.266 | Plastic | 1.544 | 55.9 | 5.80 |
| 9 | | −9.997 | ASP | −0.122 | | | | |
| 10 | Stop | Plano | | 0.497 | | | | |
| 11 | Lens 5 | −0.865 | ASP | 0.280 | Plastic | 1.640 | 23.3 | −17.44 |
| 12 | | −1.056 | ASP | 0.169 | | | | |
| 13 | Lens 6 | 2.335 | ASP | 0.824 | Plastic | 1.544 | 55.9 | −32.68 |
| 14 | | 1.807 | ASP | 0.700 | | | | |
| 15 | IR-cut filter | Plano | | 0.210 | Glass | 1.517 | 64.2 | — |
| 16 | | Plano | | 0.498 | | | | |
| 17 | Image | Plano | | — | | | | |

Note:
Reference wavelength (d-line) is 587.6 nm.
Half of the diameter of the stop at Surface 10 is 1.190 mm.

TABLE 14

Aspheric Coefficients

| Surface # | 2 | 3 | 4 | 5 | 6 | 7 |
|---|---|---|---|---|---|---|
| k = | −1.0169E−01 | −9.0000E+01 | −2.7343E+01 | −5.6781E+00 | −7.8963E+01 | −7.8058E+01 |
| A4 = | 2.8426E−03 | −9.3419E−02 | −1.1190E−01 | 1.2473E−01 | −1.8341E−02 | −6.6689E−02 |
| A6 = | 1.4769E−02 | 1.3223E−01 | 1.3128E−01 | 5.4620E−02 | −3.9690E−02 | −2.0552E−02 |
| A8 = | −3.2253E−02 | −9.8233E−02 | 5.0110E−02 | 1.6474E−01 | 1.6667E−02 | 6.3788E−03 |
| A10 = | −3.1358E−02 | −3.3663E−03 | −1.2932E−01 | −2.1820E−01 | 5.7533E−02 | 2.5307E−02 |
| A12 = | 9.9830E−02 | 4.2792E−02 | 4.5003E−02 | 1.5378E−01 | −6.4773E−04 | 8.9268E−04 |
| A14 = | −7.7512E−02 | −3.6527E−02 | 1.5158E−02 | −2.4257E−02 | | |

| Surface # | 8 | 9 | 11 | 12 | 13 | 14 |
|---|---|---|---|---|---|---|
| k = | −5.2108E+01 | 2.0000E+01 | −3.3089E+00 | −7.7467E−01 | −2.0909E+01 | −9.3536E+00 |
| A4 = | −1.3602E−01 | −7.1468E−02 | −6.0938E−02 | 1.1303E−01 | −1.6515E−01 | −8.1998E−02 |
| A6 = | −5.7996E−02 | −6.8527E−02 | −1.4632E−02 | −2.7538E−02 | 9.2446E−02 | 3.1848E−02 |
| A8 = | 6.1729E−03 | 1.8624E−02 | 1.1337E−02 | 2.9027E−02 | −6.5577E−02 | −1.3784E−02 |
| A10 = | −2.9332E−02 | 3.5132E−02 | −4.4888E−02 | 8.6402E−03 | 3.8564E−02 | 4.4343E−03 |
| A12 = | 2.1352E−02 | −2.6218E−03 | −5.0588E−03 | −4.2045E−03 | −1.2211E−02 | −9.0506E−04 |
| A14 = | 6.1853E−02 | 8.8891E−04 | 2.5658E−03 | −3.3509E−03 | 1.9094E−03 | 1.0311E−04 |
| A16 = | −4.8470E−02 | | 4.6847E−04 | 9.4909E−04 | −1.1781E−04 | −4.8362E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 13 and Table 14 as the following values and satisfy the following relationships:

| 7th Embodiment | | | |
|---|---|---|---|
| f [mm] | 4.14 | R12/R11 | 0.77 |
| Fno | 2.23 | R12/f2 | −0.30 |
| HFOV [deg.] | 34.9 | f/f5 | −0.24 |
| V5/V1 | 0.42 | \|f/f3\| + \|f/f5\| + \|f/f6\| | 0.42 |
| f/(CT3 + CT4 + CT5) | 5.20 | Yc61 [mm] | 0.73 |
| CT5/CT6 | 0.34 | | 1.81 |
| (T12 + T34 + T56)/(T23 + T45) | 0.68 | Yc62 [mm] | 1.17 |
| (R7 + R8)/(R7 − R8) | −0.37 | Yc62/f | 0.282 |
| (R9 − R10)/(R9 + R10) | −0.10 | | |

It is to be noted that TABLES 1-14 show different data of the different embodiments; however, the data of the different embodiments are obtained from experiments. Therefore, any imaging lens system of the same structure is considered to be less than or equal to the scope of the present disclosure even if it uses different data. The embodiments depicted above and the appended drawings are exemplary and are not intended to limit the scope of the present disclosure.

What is claimed is:

1. An optical image collecting system comprising, in order from an object side to an image side thereof:
   a first lens element with positive refractive power having a convex object-side surface;
   a second lens element having refractive power;
   a third lens element having refractive power;
   a fourth lens element having refractive power;
   a fifth lens element with refractive power having a concave object-side surface and a convex image-side surface, wherein at least one of the object-side surface and the image-side surface of the fifth lens element is aspheric; and
   a sixth lens element with refractive power having a concave image-side surface at a paraxial region, wherein the image-side surface of the sixth lens element changes from concave at the paraxial region to convex at a peripheral region, and both of an object-side surface and the image-side surface of the sixth lens element are aspheric,
   wherein the said optical image collecting system has a total of six lens elements with refractive power; and
   wherein a focal length of the optical image collecting system is f, a focal length of the fifth lens element is f5, a vertical distance between a non-axial critical point on the image-side surface of the sixth lens element and an optical axis is Yc62, a central thickness of the third lens element is CT3, a central thickness of the fourth lens element is CT4, a central thickness of the fifth lens element is CT5, and the following relationships are satisfied:

$-1.3 < f/f5 < 0.7$;

$0.15 < Yc62/f < 0.50$;

and $4.6 < f/(CT3+CT4+CT5) < 7.0$.

2. The optical image collecting system of claim 1, wherein the second lens element has negative refractive power and a concave image-side surface.

3. The optical image collecting system of claim 2, wherein the object-side surface of the sixth lens element is convex at a paraxial region.

4. The optical image collecting system of claim 3, wherein the fourth lens element has positive refractive power.

5. The optical image collecting system of claim 4, wherein the second lens element has a convex object-side surface.

6. The optical image collecting system of claim 4, wherein the first lens element has a concave image-side surface.

7. The optical image collecting system of claim 4, wherein the fifth lens element has negative refractive power.

8. The optical image collecting system of claim 2, wherein the focal length of the optical image collecting system is f, the central thickness of the third lens element is CT3, the central thickness of the fourth lens element is CT4, the central thickness of the fifth lens element is CT5, and the following relationship is satisfied:

$4.85 < f/(CT3+CT4+CT5) < 6.5$.

9. The optical image collecting system of claim 2, wherein a vertical distance between a non-axial critical point on the object-side surface of the sixth lens element and an optical axis is Yc61, the vertical distance between a non-axial point on the image-side surface of the sixth lens element and the optical axis is Yc62, and the following relationship is satisfied:

$Yc62 > Yc61$.

10. The optical image collecting system of claim 2, wherein the focal length of the optical image collecting system is f, the focal length of the fifth lens element is f5, and the following relationship is satisfied:

$-0.7 < f/f5 < 0.5$.

11. The optical image collecting system of claim 10, wherein an Abbe number of the first lens element is V1, an Abbe number of the fifth lens element is V5, and the following relationship is satisfied:

$0.3 < V5/V1 < 0.6$

12. The optical image collecting system of claim 10, wherein the focal length of the optical image collecting system is f, a focal length of the third lens element is f3, the focal length of the fifth lens element is f5, a focal length of the sixth lens element is f6, and the following relationship is satisfied:

$0.2 < |f/f3|+|f/f5|+|f/f6| < 1.0$.

13. The optical image collecting system of claim 10, wherein at least one stop is disposed between the third lens element and the sixth lens element.

14. The optical image collecting system of claim 10, wherein at least four lens elements with refractive power among the first through sixth lens elements of the optical image collecting system have a central thickness less than or equal to 0.300 mm.

15. An optical image collecting system comprising, in order from an object side to an image side thereof:
    a first lens element with positive refractive power having a convex object-side surface;
    a second lens element with negative refractive power having a concave image-side surface;
    a third lens element having refractive power;
    a fourth lens element having refractive power;

a fifth lens element with refractive power having a concave object-side surface and a convex image-side surface; and a sixth lens element with refractive power having a concave image-side surface at a paraxial region, wherein the image-side surface of the sixth lens element changes from concave at the paraxial region to convex at a peripheral region, and both of an object-side surface and the image-side surface of the sixth lens element are aspheric, wherein the optical image collecting system has a total of six lens elements with refractive power; and wherein a focal length of the optical image collecting system is f, a focal length of the fifth lens element is f5, a vertical distance between a non-axial critical point on the image-side surface of the sixth lens element and an optical axis is Yc62, a curvature radius of an object-side surface of the fourth lens element is R7, a curvature radius of an image-side surface of the fourth lens element is R8, and the following relationships are satisfied:

$-1.3 < f/f5 < 0.7;$ $0.15 < Yc62/f < 0.50;$ and $-2.0 < (R7+R8)/(R7-R8) < 0.6.$

16. The optical image collecting system of claim 15, wherein a curvature radius of the object-side surface of the sixth lens element is R11, a curvature radius of the image-side surface of the sixth lens element is R12, and the following relationship is satisfied:

$0.2 < R12/R11 < 1.5.$

17. The optical image collecting system of claim 16, wherein the focal length of the optical image collecting system is f, a central thickness of the third lens element is CT3, a central thickness of the fourth lens element is CT4, a central thickness of the fifth lens element is CT5, and the following relationship is satisfied:

$4.0 < f/(CT3+CT4+CT5) < 9.0.$

18. The optical image collecting system of claim 16, wherein the fourth lens element has positive refractive power, the curvature radius of the image-side surface of the sixth lens element is R12, a focal length of the second lens element is f2, and the following relationship is satisfied:

$-0.6 < R12/f2 < 0.$

19. The optical image collecting system of claim 16, wherein a central thickness of the fifth lens element is CT5, a central thickness of the sixth lens element is CT6, and the following relationship is satisfied:

$0.20 < CT5/CT6 < 0.65.$

20. The optical image collecting system of claim 15, wherein a curvature radius of the object-side surface of the fifth lens element is R9, a curvature radius of the image-side surface of the fifth lens element is R10, and the following relationship is satisfied:

$-0.30 < (R9-R10)/(R9+R10) < 0.20.$

21. The optical image collecting system of claim 20, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following relationship is satisfied:

$0.15 < (T12+T34+T56)/(T23+T45) < 0.90.$

22. The optical image collecting system of claim 20, wherein all of the lens elements with refractive power are made of plastic material, and each of the object-side surface and the image-side surface of every lens element is aspheric; the object-side surface of the sixth lens element is convex at a paraxial region; a vertical distance between a non-axial critical point on the object-side surface of the sixth lens element and an optical axis is Yc61, the vertical distance between a non-axial point on the image-side surface of the sixth lens element and an optical axis is Yc62, and the following relationship is satisfied:

$Yc62 > Yc61.$

* * * * *